United States Patent [19]
Lombardi et al.

[11] Patent Number: 5,257,689
[45] Date of Patent: Nov. 2, 1993

[54] APPARATUS FOR SUBSTANTIALLY SIMULTANEOUSLY PROCESSING MULTIPLE ELECTRIC MOTOR PARTS

[75] Inventors: Massimo Lombardi, Scandicci; Luciano Santandrea, both of Tavarnelle Val di Pesa, Italy

[73] Assignee: Axis USA, Inc., Marlborough, Mass.

[21] Appl. No.: 927,098

[22] Filed: Aug. 7, 1992

Related U.S. Application Data

[63] Continuation of Ser. No. 683,049, Apr. 10, 1991, Pat. No. 5,145,052, which is a continuation of Ser. No. 683,195, Apr. 10, 1991.

[51] Int. Cl.$^5$ .............................. B65G 47/86
[52] U.S. Cl. .................... 198/468.2; 414/736; 198/346.2; 29/732
[58] Field of Search ............ 198/346.2, 468.2; 29/596, 732, 736; 414/736, 783

[56] References Cited

U.S. PATENT DOCUMENTS

| | | | |
|---|---|---|---|
| 1,909,813 | 5/1933 | Crosbie | 414/736 |
| 2,348,948 | 5/1944 | Allen | 242/13 |
| 3,468,435 | 9/1969 | Ellwanger et al. | 198/468.2 X |
| 3,878,602 | 4/1975 | Schubert et al. | 29/598 |
| 3,903,593 | 9/1975 | Mason | 29/732 |
| 3,924,816 | 12/1975 | Schubert et al. | 242/7.05 B |
| 4,256,429 | 3/1981 | Dwyer | 294/103.1 |
| 4,466,768 | 8/1984 | Datseris et al. | 294/86.41 |
| 4,505,636 | 3/1985 | Sugino et al. | 414/736 |
| 4,571,813 | 2/1986 | Fukuoka et al. | 414/736 X |
| 4,645,411 | 2/1987 | Madwed | 294/106 |
| 4,699,414 | 10/1987 | Jones | 294/119.1 |
| 4,707,013 | 11/1987 | Vranish et al. | 294/119.1 |
| 4,839,961 | 6/1989 | Vermeer | 294/119.1 |
| 4,974,313 | 12/1990 | Reiger, Jr. | 29/736 |
| 5,145,052 | 9/1992 | Santandrea et al. | 198/468.2 |

FOREIGN PATENT DOCUMENTS

| | | |
|---|---|---|
| 182180 | 5/1986 | European Pat. Off. |
| 348715 | 1/1990 | European Pat. Off. |
| 2904377 | 8/1980 | Fed. Rep. of Germany |
| 3126873 | 1/1983 | Fed. Rep. of Germany ... 294/86.41 |
| 3149779 | 6/1983 | Fed. Rep. of Germany |
| 3329619 | 3/1985 | Fed. Rep. of Germany |
| 239558 | 10/1986 | Fed. Rep. of Germany |
| 3615164 | 8/1987 | Fed. Rep. of Germany |
| 251519 | 11/1987 | Fed. Rep. of Germany |
| 3806333 | 9/1989 | Fed. Rep. of Germany |
| 63-123653 | 5/1988 | Japan ................................. 414/736 |
| 835898 | 6/1981 | U.S.S.R. ............................. 198/346.2 |
| 1283089 | 1/1987 | U.S.S.R. ............................. 414/736 |
| 1315227 | 6/1987 | U.S.S.R. ............................. 414/736 |
| 1399116 | 5/1988 | U.S.S.R. ............................. 294/86.41 |

OTHER PUBLICATIONS

"The Aumann Production Line AFS for Manufacturing Armatures for Universal Motors," Willy Aumann KG, Espelkamp, Germany, 1987.

"The Aumann Production-Systems; Armature Winding Machines AEW, ADW," Willy Aumann KG, Espelkamp, Germany, 1988.

Primary Examiner—Robert P. Olszewski
Assistant Examiner—James R. Bidwell
Attorney, Agent, or Firm—Robert R. Jackson; Karen G. Horowitz

[57] ABSTRACT

Multiple electric motor parts are processed simultaneously by apparatus which removes the parts from a conveyor (on which the parts are side by side in a substantially horizontal plane), repositions the parts so that they are vertically above one another, processes the parts while they are thus repositioned, and then returns the parts to the conveyor in their original side by side relationship in a horizontal plane. In addition, a gripper apparatus for electric motor components that can be used to grip components of different sizes, and that can rotationally index electric motor components of different sizes, is provided. The gripper apparatus has two oppositely facing gripper arms with complementary V-shaped faces sized to accommodate a range of sizes of components. The arms are moved together in unison to center and grip the component. After the component has been gripped, an indexing pawl rotates the component. A tooth is urged against the component and stops the rotation when it enters a depression or slot in the component, indicating that the desired angular position has been reached.

19 Claims, 18 Drawing Sheets

APPARATUS FOR SUBSTANTIALLY SIMULTANEOUSLY PROCESSING MULTIPLE ELECTRIC MOTOR PARTS

This is a continuation of application Ser. No. 683,049, filed Apr. 10, 1991, now U.S. Pat. No. 5,145,052 and U.S. Ser. No. 683,195, filed Apr. 10, 1991.

BACKGROUND OF THE INVENTION

This invention relates to electric motor manufacturing equipment, and more particularly to electric motor manufacturing equipment which is capable of simultaneously processing two or more electric motor parts. Additionally, this invention relates to electric motor manufacturing equipment having gripper apparatus for transferring electric motor components in both directions between a conveyor of an electric motor component production line and the manufacturing equipment. In particular, the preferred gripper apparatus of this invention can accommodate components of various sizes with little or no special setup to vary the size, and has integral apparatus for rotating components to desired angular orientations.

In production lines for electric motor components— e.g., production lines for armatures or stators—it is customary for the components, in their various stages of formation, to travel along a conveyor, alongside of which are disposed various workstations at which electric motor manufacturing equipment perform the different operations necessary to form the components. In such a production line, the component is removed from the conveyor by appropriate robotic or other transfer apparatus, moved to the manufacturing equipment and held there while that workstation's operation is performed, and then returned to the conveyor.

There is increasing interest among electric motor manufacturers in electric motor manufacturing equipment which can be set up to process two or more different types of electric motor parts in a single production run (so-called mixed production). There is also increasing interest in equipment which achieves greater throughput by processing two or more parts simultaneously or substantially simultaneously. On the other hand, it is not desirable to increase the floor space occupied by the equipment because this increases space cost, increases the cost of whatever conveyor apparatus is used to carry parts throughout the system, increases parts travel time throughout the system, makes the system more difficult to observe, etc.

It is therefore an object of this invention to provide improved apparatus for simultaneously processing multiple electric motor parts.

It is another object of this invention to provide apparatus for simultaneously processing multiple electric motor parts which may be the same or different, and which can be easily changed from time to time.

It is still another object of this invention to provide apparatus for simultaneously processing multiple electric motor parts without substantially increasing the floor space or conveyor run length required to similarly process electric motor parts one at a time.

Additionally, the transfer apparatus of electric motor manufacturing equipment of the present invention usually includes a gripper for actually picking up and holding the component. Frequently, the gripper also rotationally indexes the component if the particular workstation requires a particular angular orientation of the component to perform its operation.

When assembling motors of different sizes, it is usually necessary to reconfigure the production line to accommodate the different-sized components, such as armatures. Such reconfiguration includes removing the grippers at each workstation and replacing them with grippers of a different size. Grippers that can handle more than one size are not generally available. Providing a gripper that can handle components of more than one size is particularly complicated when the component must be rotationally indexed. Rotational indexing is frequently measured in the case of armatures by the positions of the core slots, which have a defined angular spacing. However, in armatures of different sizes, the angular spacing of the core slots can differ.

It is therefore an additional object of this invention to provide apparatus for processing electric motor parts which has gripper apparatus for gripping electric motor components of different sizes.

It is also an object of this invention to provide apparatus for processing electric motor parts which has gripper apparatus that can rotationally index electric motor components of different sizes.

SUMMARY OF THE INVENTION

These and other objects of the invention are accomplished in accordance with the principles of the invention by providing apparatus in which multiple electric motor parts are processed one above the other in at least some of the processing stations. The parts are conveyed between stations substantially side by side in a substantially horizontal plane. At a processing station, however, two or more parts are removed from the conveyor and repositioned so that they are vertically above one another. In that relative position, the two or more parts are processed substantially simultaneously by vertically adjacent processors. Thereafter, the processed parts are returned to the conveyor in a horizontal side by side relationship which is the same as or similar to their original relationship.

Because the multiple motor parts are processed while vertically above one another, the apparatus of this invention does not take up substantially more floor space than prior art apparatus. Conveyor runs are also not substantially increased in length. If desired, the individual processors may be mounted and/or constructed to facilitate easy and individual change for either partial or complete conversion of the apparatus to different types of parts. This facilitates all kinds of production changes, including mixed production.

Also in accordance with this invention, there is provided electric motor processing apparatus having gripper apparatus for gripping an electric motor component. The gripper apparatus accommodates electric motor components of varying sizes and includes first and second gripper arms for contacting the component. Each of the gripper arms has a gripper surface shaped to prevent translation of the component. At least one of the gripper arms is movable toward and away from the other gripper arm. The gripper apparatus also includes means for moving the at least one gripper arm for causing the gripper arms to contact the component surface. The gripper surfaces are shaped so that movement of one gripper arm toward and away from the other gripper arm allows the gripper arms to accommodate components of varying sizes.

The gripper apparatus of this invention also provides, in cases where rotational indexing of the component is required, that the gripper surface is also shaped to allow rotation of the component about the component axis. Such gripper apparatus also includes indexing means for engaging the component surface and causing rotation of the component about the component axis, stopping means for stopping rotation of the component by the indexing means after the indexing means has rotated the component to a desired position, and disengaging means associated with the stopping means for disengaging the indexing means when the stopping means stops the rotation.

Further features of the invention, its nature and various advantages will be more apparent from the accompanying drawings and the following detailed description of the preferred embodiments.

BRIEF DESCRIPTION OF THE DRAWINGS

FIG. 9 shows elements broken off in FIG. 8, albeit at a different scale and from a different direction.

DETAILED DESCRIPTION OF THE PREFERRED EMBODIMENTS

Although the principles of this invention are equally applicable to processing other types of electric motor parts such as stators, and to performing processing steps other than coil winding, the invention will be fully understood from the following description of an illustrative embodiment of apparatus for winding coils on electric motor armatures. Similarly, although pelletized conveyance of the armatures is employed in the depicted illustrative embodiment, it will be understood that other types of parts conveyance can be used instead if desired.

Figure 1:
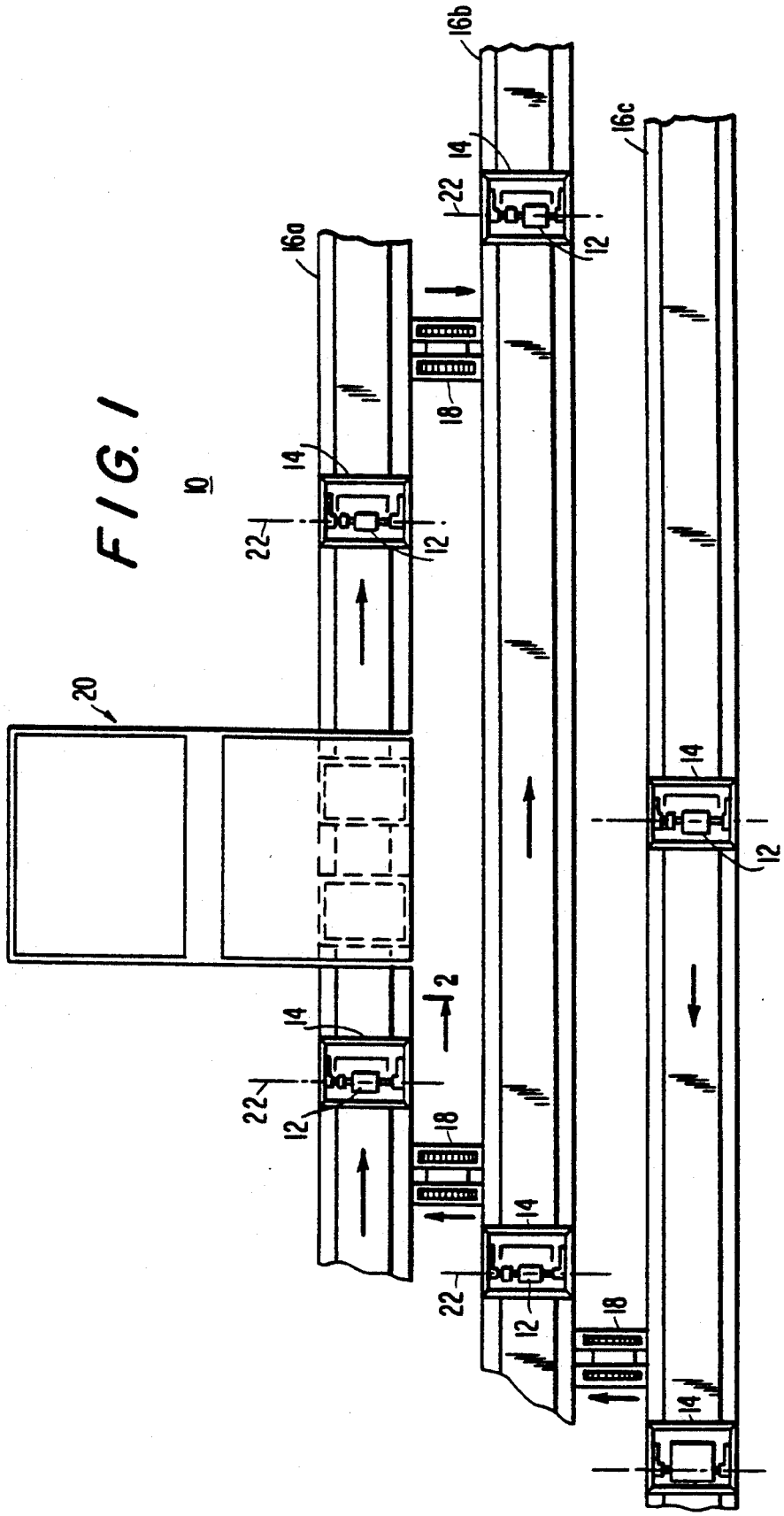
FIG. 1 is a simplified plan view of illustrative apparatus which employs the principles of this invention.

As shown in FIG. 1, in illustrative armature processing line 10, armatures 12 are conveyed on pallets 14 on several parallel conveyor lines 16a, 16b, and 16c. For example, pallets bearing armatures for winding may be conveyed to and from armature winding station 20 from left to right as viewed in FIG. 1 on conveyor 16a. Conveyor 16b, travelling in the same direction as conveyor 16a, allows armatures to bypass winding station 20 (e.g., in order to get to or from other winding stations which are not shown in the drawing). Conveyor 16c, travelling in the opposite direction, returns empty pallets to the start of the line for reloading. Armatures which have not been fully processed (e.g., because the processing equipment appropriate for that type of armature was temporarily out of service or too busy) may also be moved back upstream via conveyor 16c. Inter-conveyor transfer devices 18 are located between adjacent conveyors for transferring pallets from conveyor to conveyor as desired.

Note that the armatures are conveyed to and from winding station 20 substantially side by side in a substantially horizontal plane. This just means that the armatures are horizontally adjacent to one another while on the conveyor. Although in the depicted preferred embodiment the longitudinal axes 22 of the armatures are parallel to one another and horizontal, the armatures could be oriented differently on the pallets (e.g., with axes 22 aligned, or with axes 22 vertical and parallel) and they would still be substantially side by side in a substantially horizontal plane as that phrase is employed herein.

Although (as has been mentioned) any other type of armature conveyance could be used instead, in the depicted preferred embodiment armatures 12 are conveyed on pallets 14 of the general type shown in U.S. Pat. Nos. 5,060,781, 5,115,901, and 5,060,780. In particular, each pallet 14 has an open rectangular base 24 (see also FIGS. 2-4) on which are mounted supports 26a and 26b for supporting the respective opposite ends of an armature shaft. The spacing between supports 26a and 26b is adjustable to facilitate adapting the line for processing different armature sizes, either at different times or at the same time, as desired. To illustrate this point it will be noted that two different sizes of armatures are shown being processed simultaneously in the drawings. Each pallet 14 may carry a coding device 28 (FIG. 2) which indicates the type of armature being carried by that pallet, and also possibly the status of the processing of the armature on that pallet. This coding device is read (and also possibly updated) by readers 30 at various points throughout the processing line in order to monitor and control processing of the armatures.

As will become more apparent as the description proceeds, winding station 20 is capable of winding two armatures simultaneously. In order to do this, winding station 20 must first be supplied with two unwound armatures of the correct type (assuming that different types of armatures are being processed during a given production run). This is accomplished by the conveyor system which directs pallets carrying unwound armatures of the proper type or types to positions on conveyor 16a adjacent winding station 20 where the winding station apparatus can remove the armatures from their pallets for winding.

Figure 3:
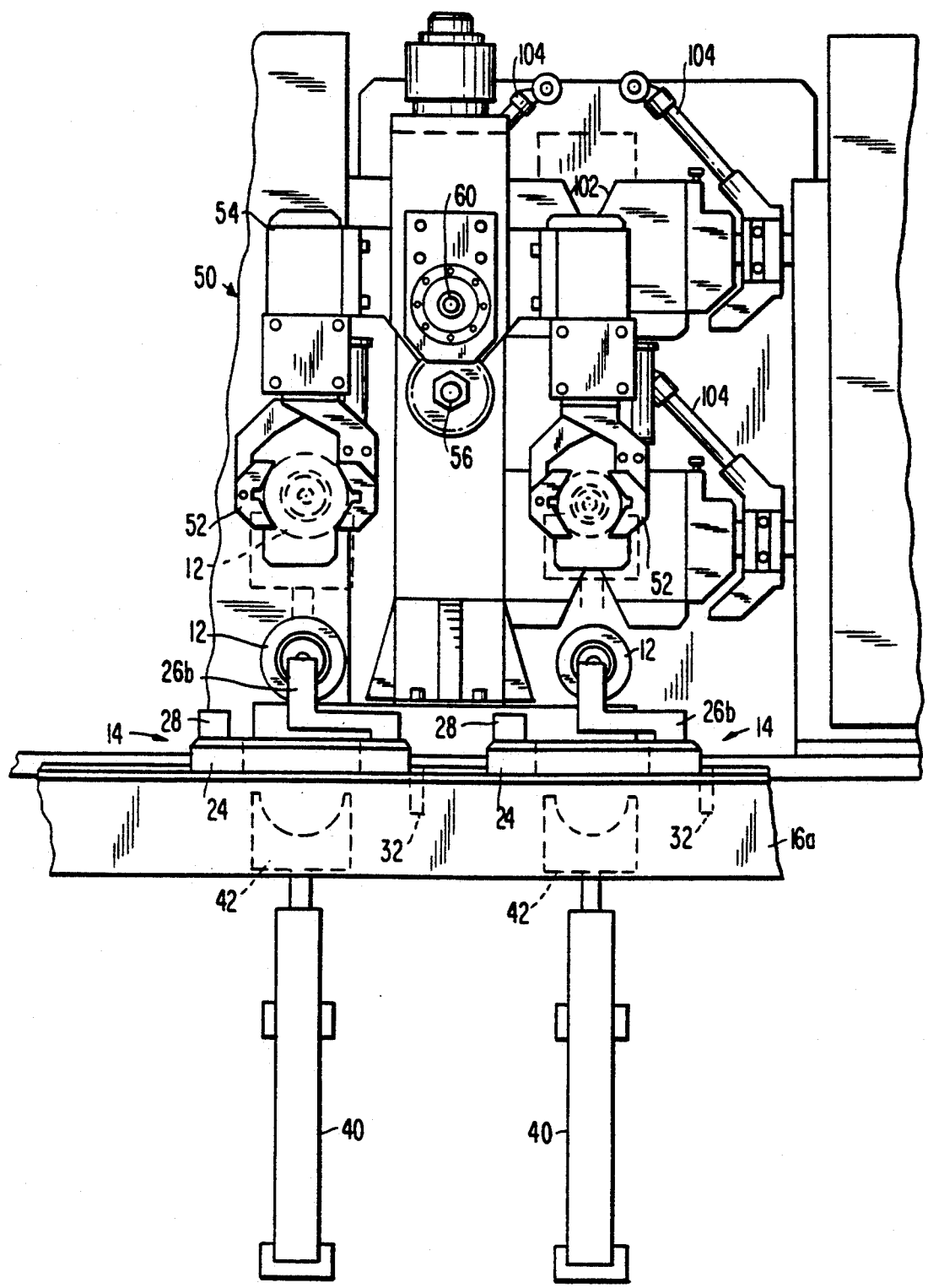
FIG. 3 is a partial elevational view taken along the line 3—3 in FIG. 2.

As shown in FIG. 3, stops 32 stop the desired pallets at the correct positions relative to winding station 20. Elevators 40 then extend upward through conveyor 16a and the open centers of pallets 14 in order to lift armatures 12 up off of supports 26 to the positions shown in dotted lines in FIG. 3. In these positions armatures 12 can be gripped by the grippers 52 of a first transfer mechanism 50. Although any other suitable grippers can be employed, particularly preferred grippers are shown in FIGS. 10-21 and described in detail below. As a possible alternative to providing elevators 40 for lifting armatures 12 up off of pallets 14, transfer mechanism 50 could be constructed so that grippers 52 move down to grip the armatures and then move back to the position shown in FIG. 3.

Figure 4:
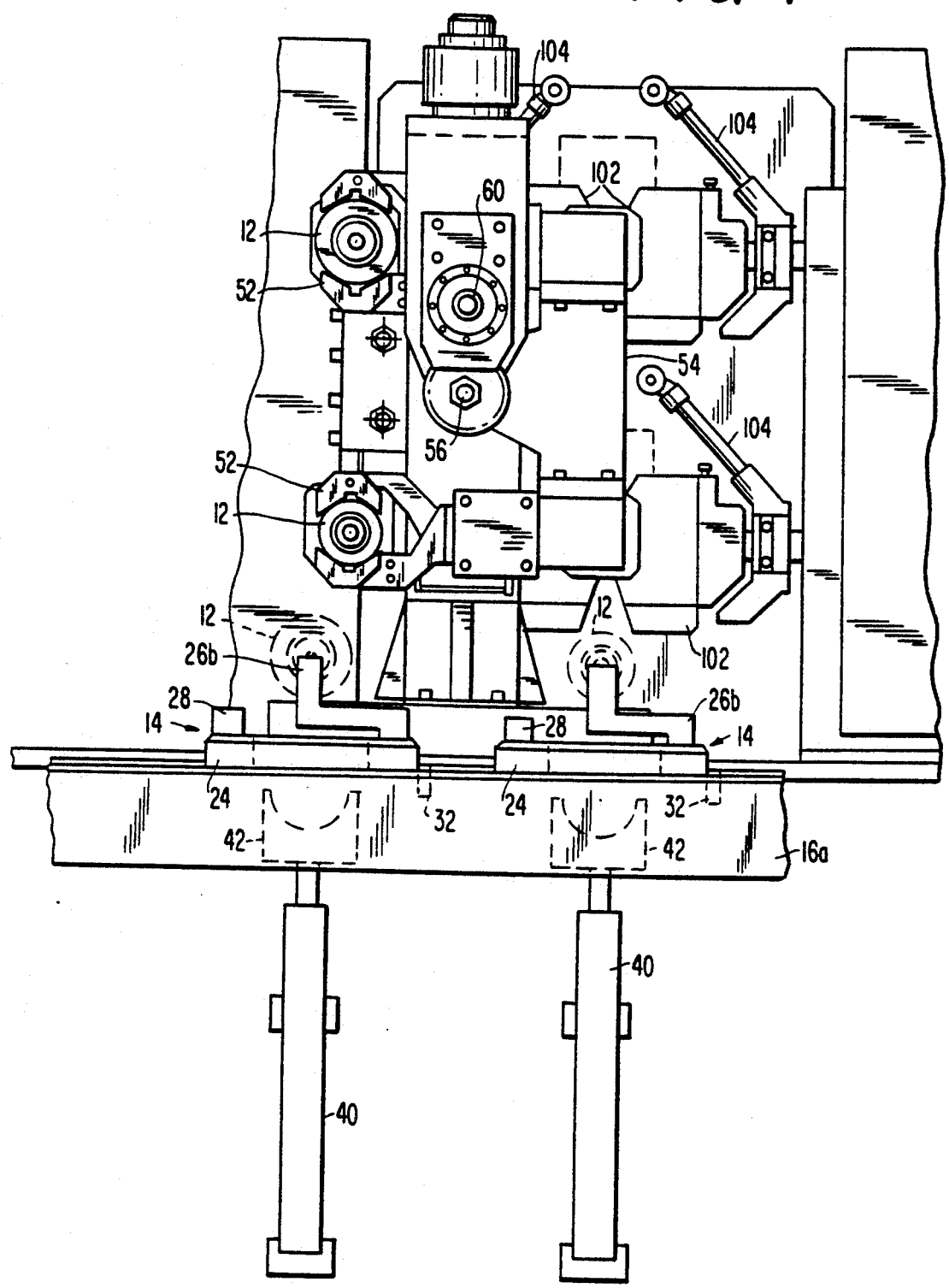
FIG. 4 is a view similar to FIG. 3 but showing the apparatus in a different operating condition.
Figure 5:
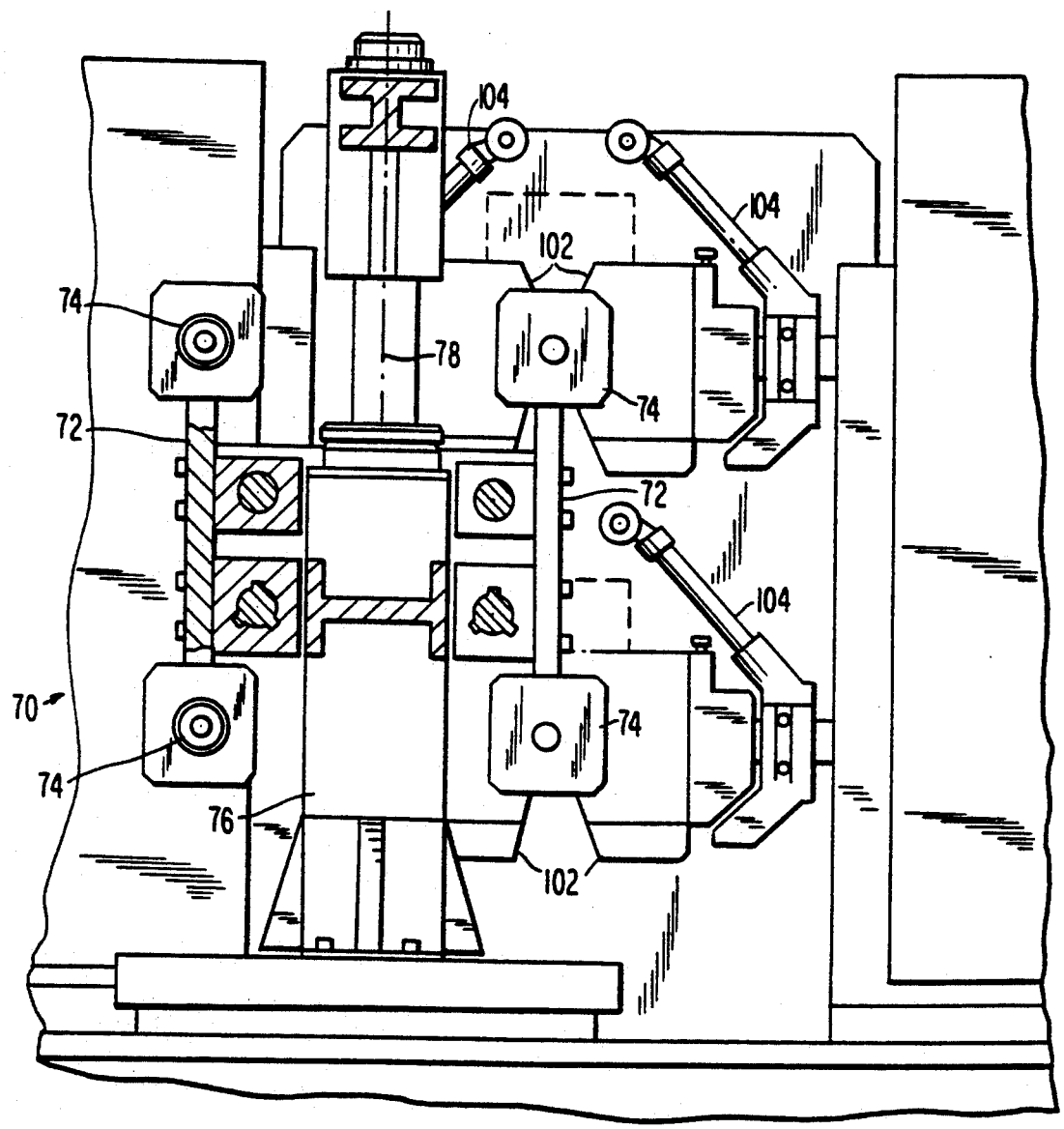
FIG. 5 is a partial sectional view taken along the line 5—5 in FIG. 2.

Returning to the depicted embodiment, when armatures 12 have been gripped by grippers 52, elevators 40 are lowered sufficiently to allow the cross arm 54 of transfer mechanism 50 to rotate 90° about axis 56 from the position shown in FIG. 3 to the position shown in FIG. 4. This rotation of cross arm 54 is accomplished by motor 58 (FIG. 2) whose shaft 60 is geared to a gear concentric with axis 56 and fixed relative to cross arm 54. Because grippers 52 are mounted on cross arm 54, the above-described 90° rotation of the cross arm repositions armatures 12 relative to one another from the horizontal side by side relationship shown in FIG. 3 to the position shown in FIG. 4 in which one armature is vertically above the other.

Figure 6:
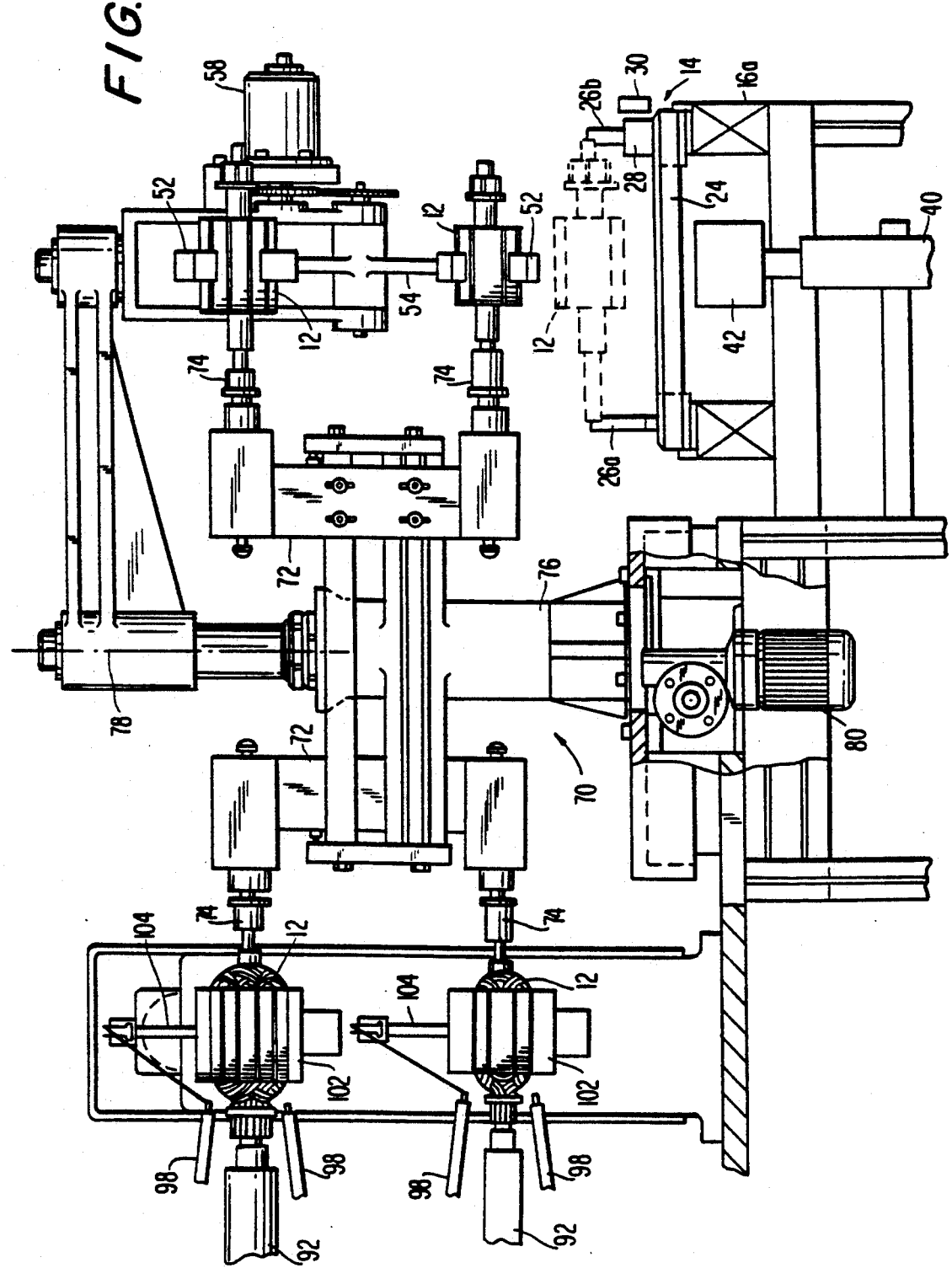
FIG. 6 is a view generally similar to a portion of FIG. 2 but showing the apparatus in a different operating condition.

After cross arm 54 has been rotated as described above, the transfer mechanism 70 cross arm 72 which is nearer the unwound armatures is moved toward those armatures so that the grippers 74 on that cross arm can grip the axial ends of the armatures (as shown FIG. 6). (Grippers 74 may be constructed as shown in commonly assigned, co-pending U.S. patent application Ser. No. 539,989, filed Jun. 18, 1990, refiled as U.S. application Ser. No. 829,585 on Feb. 3, 1992, now U.S. Pat. No. 5,178,428.) Thereafter, grippers 52 release the armatures, cross arms 72 retract, and the assembly 76 carrying both of cross arms 72 rotates 180° about vertical axis 78. This rotation is accomplished by motor 80 acting through appropriate mechanical connections to assembly 76.

After the above-described 180° rotation of assembly 76, the cross arm 72 carrying the unwound armatures is again extended away from axis 78 in order to insert the remote ends of the armature shafts in collets 92 of gripping and indexing mechanisms 90. Collets 92 are then operated to grip the ends of the armature shafts thus positioned in them, after which grippers 74 can release the armatures. Collets 92 (and associated shields) may be constructed as shown in U.S. Pat. No. 5,127,594 in order to facilitate rapid changing of the collet mechanisms and the associated shields without the need for dismounting assemblies 90 when different types of armatures are to be wound. The lead anchoring grippers 98 (discussed below) often do not require modification when different types of armatures are to be processed. But if such changes are required, they can also generally be effected without dismounting assemblies 90.

It will be noted that during the foregoing motion of elements 72 and 76 to transfer unwound armatures from grippers 52 to collets 92, the other cross arm 72 which is initially adjacent to collets 92 is performing exactly the same motion sequence to remove wound armatures from collets 92 and to position those armatures for gripping by grippers 52 and subsequent placement on the empty pallets 14 at stops 32 as will be described in more detail below.

Figure 8:
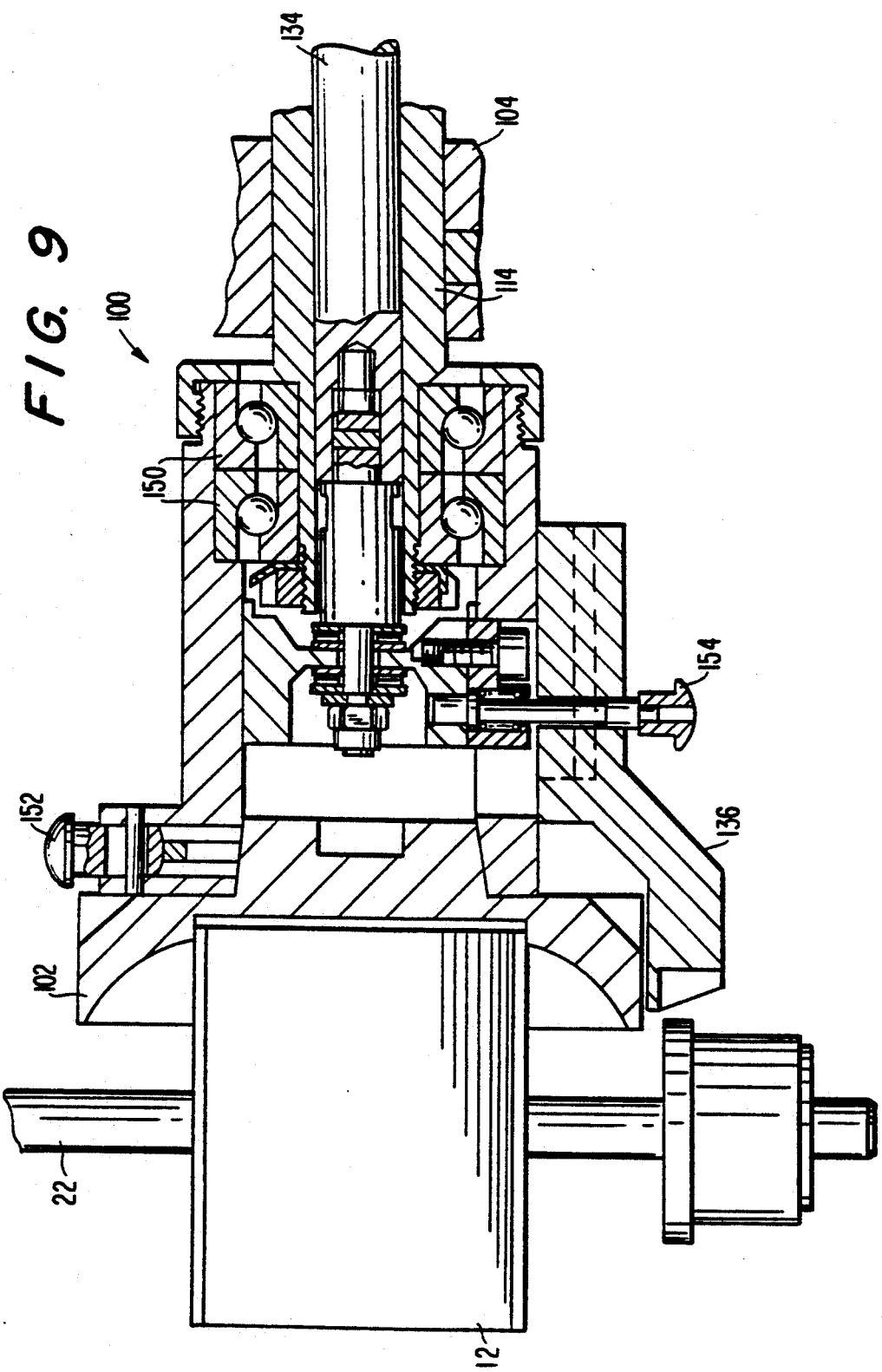
FIG. 8 is a partial sectional view taken along the line 8—8 in FIG. 2.
Figure 9:
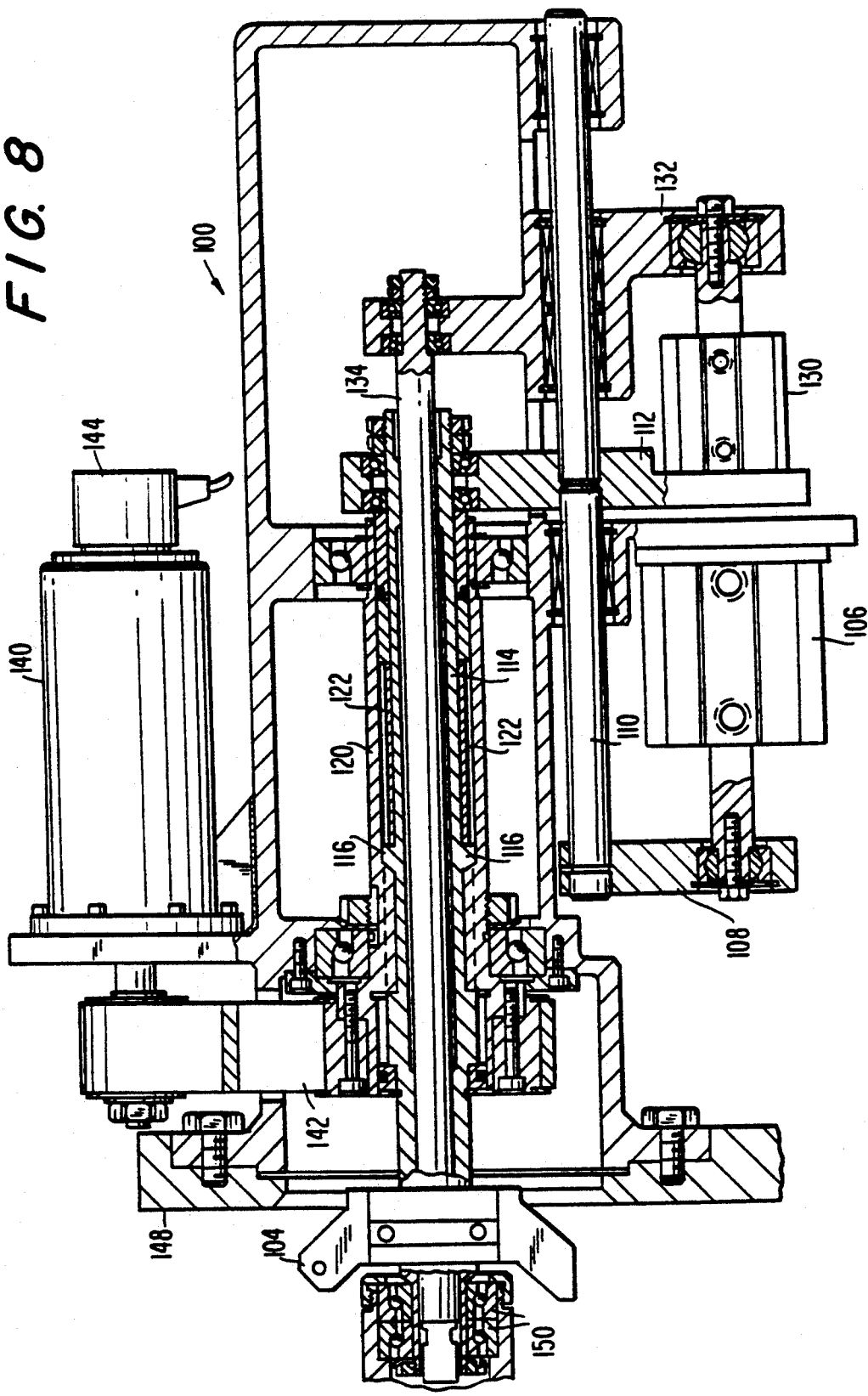
FIG. 9 is a partial sectional view taken along the line 9—9 in FIG. 2, with the addition of an armature in place for processing.

Returning now to the processing of the unwound armatures, after the ends of those armatures have been gripped by collets 92, assemblies 100 (see especially the representative assembly 100 shown partly in FIG. 8 and effectively continued in FIG. 9) located adjacent each side of each armature are operated to move a winding shroud 102 and wire-winding flyer 104 sufficiently close to the armature to allow the shrouds to guide a wire from the rotating flyer into the desired pairs of slots in the armature. This is accomplished by extending the actuator 106 in each of assemblies 100 as shown in FIG. 8. Extension of actuator 106 moves plate 108, rod 110, plate 112, tube 114, and all of the elements mounted on the left-hand end of tube 114 as viewed in FIGS. 8 and 9 (e.g., shroud 102 and flyer 104) to the left. Tube 114 can reciprocate axially in this manner relative to surrounding tube 120. However, tube 114 has outwardly extending teeth 116 which extend into axial slots 122 in tube 120 so that rotation of tube 120 is always transmitted to tube 114. Plate 112 also carries hooking plate actuator 130. Accordingly, the hooking plate elements (e.g., slide 132, rod 134, and hooking plate 136 (FIG. 9)) initially move with plate 112 in response to operation of actuator 106. When desired, however, actuator 130 can be operated to move slide 132, rod 134, and hooking plate 136 relative to shroud 102 and flyer 104 as is required to guide the armature coil leads to tangs or other elements on the associated armature in order to anchor and terminate those leads.

After shrouds 102 and flyers 104 are properly positioned adjacent the armatures, the motor 140 associated with each of assemblies 100 is operated to rotate tube 120 via timing belt 142. An encoder 144 may be associated with motor 140 in order to allow closed loop control of the motion and position of the associated flyer 104. Rotation of tube 120 rotates tube 114 which in turn rotates the flyer 104 fixed to the end of that tube. Bearings 150 between tube 114 and shroud assembly 102 support the shroud assembly on the tube but allow the shroud assembly to remain relatively stationary while the tube rotates. A quick-change mechanism 152 (described in more detail in commonly assigned, co-pending U.S. patent application Ser. No. 610,928, filed Nov. 9, 1990 allows the actual shrouds 102 to be quickly changed to conform to different armature sizes and/or winding configurations if desired. Hooking plate 136 is connected to rod 134 so that only axial motion of the rod is transmitted to the hooking plate. Hooking plate 136 may also be attached to the elements which actuate it by a quick-change mechanism 154 to facilitate rapid change of the hooking plate when different armatures are to be processed (see again U.S. patent application Ser. No. 610,928).

Figure 7:
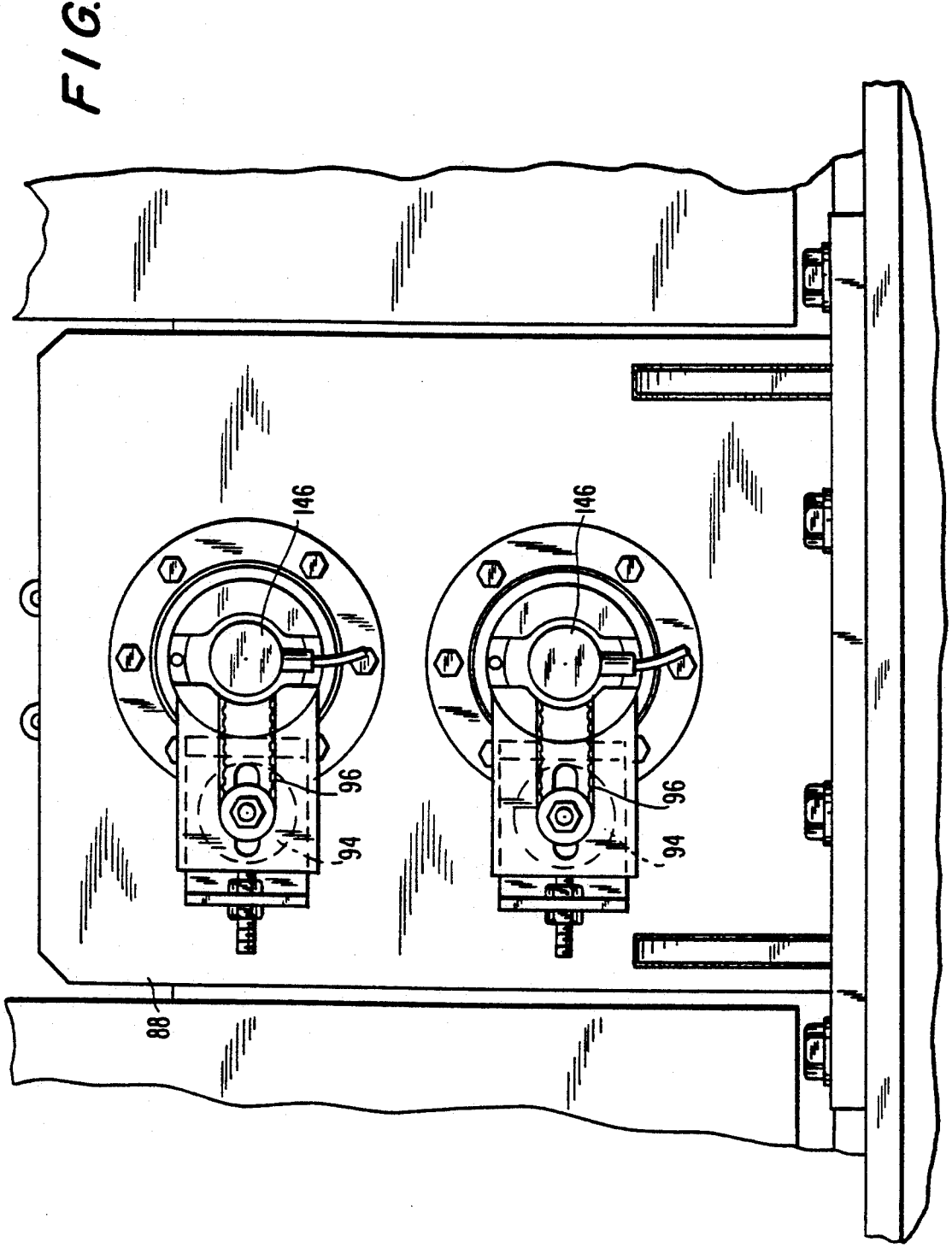
FIG. 7 is a partial elevational view taken along the line 7—7 in FIG. 2.

After flyers 104 have wound each coil, the flyers are stopped and motors 94 (FIG. 7), acting through timing belts 96, rotationally index collets 92 and thereby armatures 12 to position new slots to receive the next coils to be wound. Once again, encoders 146 may be associated with motors 94 to allow closed loop control of the angular positions of collets 92. Flyers 104 then resume rotation to wind coils in the new slots.

When each armature is fully wound, wire grippers 98 cut and hold the wire extending from each associated flyer 104.

The fully wound armatures are now ready for return to pallets 14 on conveyor 16a. Accordingly, assemblies 100 are retracted by retraction of actuators 106 (FIG. 8), and grippers 74 are operated to grip the ends of the armature shafts remote from collets 92. Collets 92 are then operated to release the armatures, and grippers 74 are moved to withdraw the armatures from the collets. Thereafter, the above-described 180° rotation of assembly 76 about axis 78, followed by outward movement of cross arms 72, positions the wound armatures for engagement by grippers 52. (These same motions of the components of transfer mechanism 70 position new unwound armatures for engagement by collets 92 as has already been described.) Grippers 52 are then operated to grip the wound armatures, which can now be released by grippers 74. Cross arm 54 is rotated back to the horizontal position shown in FIG. 3, and elevators 40 are again raised. When elevators 40 are ready to support the armatures, grippers 52 are operated to release the armatures. Elevators 40 are then lowered to place the wound armatures back on the pallets adjacent winding station 20. Conveyor 16a can then convey these pallets away and bring in new pallets bearing armatures which have yet to be wound.

The depicted system has many features which facilitate rapid total or partial change-over from processing one type of armature to processing a different type of armature. The adjustability of pallets 14 has already been mentioned. As another example, the cradle 42 at the top of each elevator 40 can be changed to engage different armature sizes, and to ensure that for any given armature size, the armature is properly positioned for engagement by a gripper 52 at the top of the elevator stroke. Each of grippers 52 can be readily changed to grip different armature sizes, and to ensure that for any given armature size, the armature is properly positioned for transfer to the associated gripper 74 when cross arm 54 is in the vertical position. Grippers 74 can also be readily changed to grip different armature sizes, and to ensure that for any given armature size, the armature is properly positioned for engagement by the associated collet 92 when cross arms 72 are in their outer positions. Assemblies 90 are individually flanged to support 88 so that each assembly can be easily removed and replaced as a unit. This facilitates off-line maintenance and repair of assemblies 90. Other respects in which winding station 20 can be easily altered are the above-described construction of collets 92 and associated shields to facilitate rapid changing of those elements, and the quick-change mounting of shrouds 102 and hooking plates 136, also described above.

Figure 2:
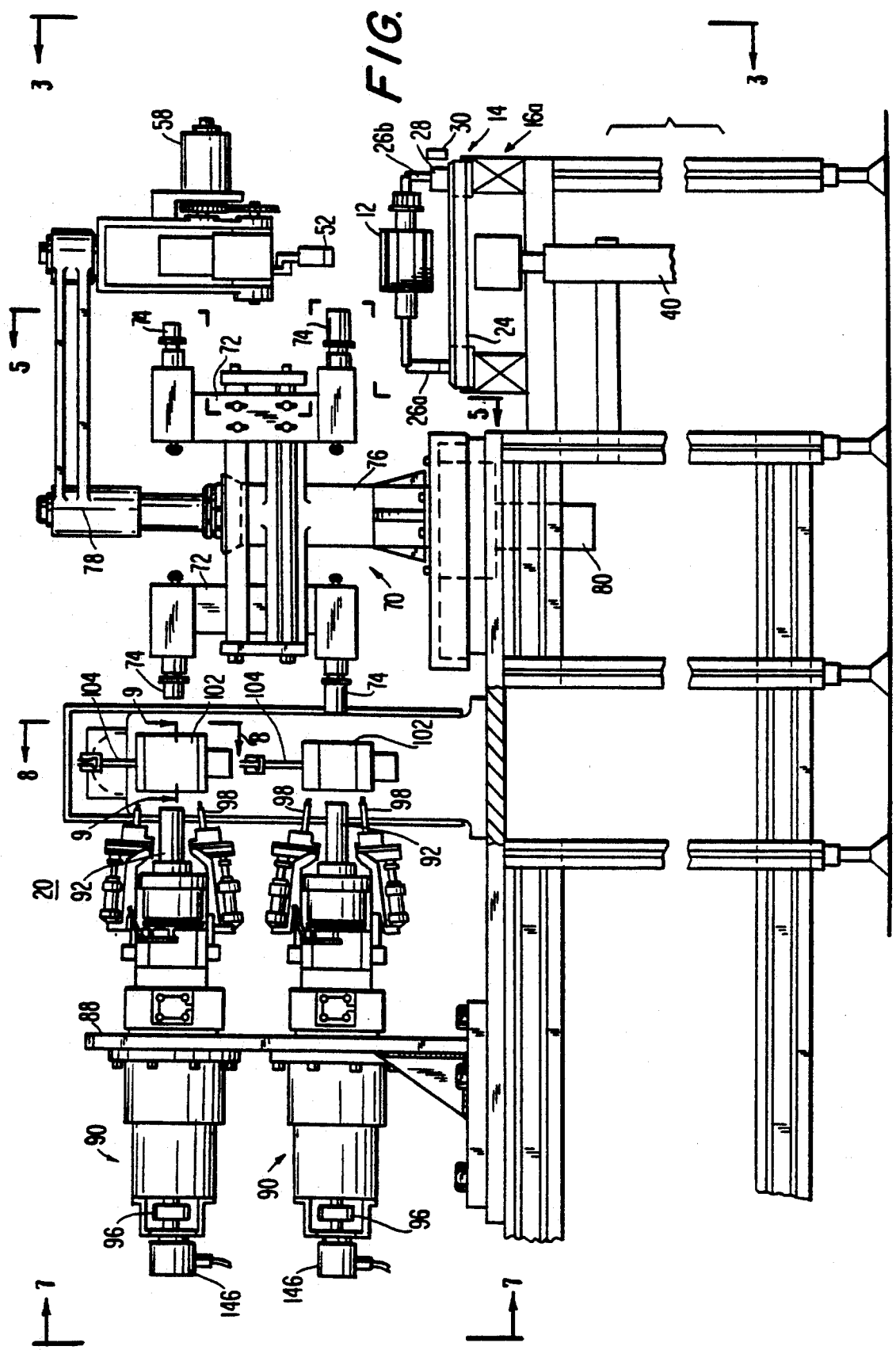
FIG. 2 is an elevational view taken generally along the line 2—2 in FIG. 1 but with some parts removed for clarity.

In addition to the advantages discussed above, the cost of machines constructed in accordance with this invention tends to be reduced by several factors such as the following. Only one base is required even though two or more motor parts are being processed above that base. Moreover, this base may be relatively small. If desired, both or all of assemblies 90 can be mounted in a single low-cost casting rather than being flanged to plate 88 as shown in FIG. 2. Similarly, both or all of assemblies 100 could be mounted in a single low-cost casting rather than being flanged to plate 148 as shown in FIG. 8. If the machine is set up to process multiple armatures of the same type, then both or all of collet mechanisms 92 can be rotated by using one motor with belt transmission to the various shafts in order to control the shafts simultaneously for the same angular motions. With only one motor, only one control is required, which can be an encoder coupled to the end of one of the collet shafts. In addition, both or all collets can be actuated by a single actuator (e.g., of the type shown at 170 in FIG. 9 of above-mentioned U.S. Pat. No. 5,127,594). Similarly, when the armatures being processed are all the same, the flyers 104 on each side of the armatures can be rotated using a single motor with belt transmission to the various shafts. Again, with only one motor, only one encoder is required for control of that motor. Still further, when only one type of armature is being processed, the reciprocating motion of the flyers 104, shrouds 102, etc., can be controlled by a single actuator 106 (e.g., by extending plate 108 of the assembly which includes the actuator to the other assembly). The same technique can be used to avoid duplication of actuators 130.

Another advantage of this invention, as discussed above, is the adjustable gripper apparatus which does not need to be replaced for varying armature sizes. Thus, manufacturing costs are reduced. Furthermore, because the preferred gripper apparatus of the present invention rotates the armature during transfer (and therefore before reaching the winding apparatus) the winding apparatus need not be interrupted from its normal functioning to index the armature for proper initial alignment. Such apparatus may also be used in conventional robotic or other transfer machines. Each of the two opposed gripper arms has a gripper surface of a shape that allows the gripper to grip components of a range of sizes between a minimum and maximum expected size. The shape of the gripper surface also provides a camming action that centers the axis of the component along the axis of the gripper apparatus regardless of the size of the component or its height above the conveyor. One preferred surface configuration for achieving these results is a V-shaped or modified V-shaped surface.

Once the component is centered along the gripper axis, the preferred gripper apparatus can also rotate the component to a desired angular orientation, again without regard to the size of the component. This is accomplished by providing appropriate stop means to stop rotation and disengage the indexing means when the desired angular position is reached. In the preferred embodiments this is achieved by providing a sensing tooth that is urged toward the component surface and activates a switch when it encounters and enters an appropriate depression or slot in the component surface.

The construction and operation of a first preferred embodiment 1000 of a gripper apparatus for use with the present invention is illustrated in FIGS. 10-17. Although the embodiments described below are discussed in connection with the production of armatures, it should be understood that the described grippers may be applied equally to apparatus for the production of other motor components, such as stators.

An armature 12 having a core 11 and shaft 13 is carried with the ends of shaft 13 bearing in opposing seats 27 of support 26. In mixed production lines or in lines which can be converted for processing armatures of different core sizes, support 26 may carry armatures having different core sizes. Shaft 13 of the armature can also vary in diameter. Variations in the diameter of shaft 13 can cause the longitudinal axis 22 of different armatures to be positioned by conveyor at different heights above a reference level 160. Gripper apparatus 1000 must be able to grip the armatures regardless of their core diameters or the height of axis 22 above level 160.

Apparatus 1000 is positioned by transfer mechanism 50, or any other conventional robotic transfer device, so that its own longitudinal axis 1018, defined by gripping members 1052, 1054 is parallel to longitudinal axis 22 of the armature. The gripper is then lowered to a predetermined height, which will be the same for all core sizes and shaft diameters to be transferred, until gripping portions 1052, 1054 surround armature core 11 to be gripped.

Gripping members 1052, 1054 are then moved towards each other along a direction which is perpendicular to axis 1018 of gripper apparatus 1000. As gripping members 1052, 1054 move toward each other, respective angled surfaces 1055, 1056 of gripping members 1052, 1054 come into contact with core 11, and perform a camming action that causes the armature to be raised so that its axis 22 is centered along longitudinal axis 1018 of gripper apparatus 10. In order to assure that the appropriate camming action will take place it is only necessary to assure that axis 22 is above the lowermost ends of surfaces 1055, 1056. This is easily accounted for as long as the smallest expected armature size is known in advance. Similarly, gripping members 1052, 1054 are sized so that longitudinal axis 1018 is never below longitudinal axis 22 of the largest expected armature.

Further opposing angled surfaces 1057, 1058 of the gripping members 1052, 1054 are provided so that the armature can be precisely positioned and securely gripped with its axis 22 coinciding with axis 1018 of the gripper. The generally concave (here, V-shaped) nature of respective gripping surfaces 1055, 1057 and 1056, 1058 also allows for rotation of the armature about axes 22, 1018 by the indexing means described below. The degree of concavity (here, the angle of the V-shape) is chosen so that the smallest expected armature size can be securely gripped before the extremities of opposed gripping surfaces 1055, 1056 and 1057, 1058 contact each other. At the same time the degree of concavity must be such that the largest expected armature size can be securely gripped without extremities of surfaces 1055, 1056, 1057, 1058 contacting the armature surface, which would prevent the armature from seating firmly against surfaces 1055, 1056, 1057, 1058.

Each of gripping members 1052, 1054 is mounted on a respective translating mechanism for movement toward and away from each other (see FIGS. 10-12), although it is possible to construct apparatus according to the invention in which only one of gripping members 1052, 1054 moves while the other is stationary.

Gripping members 1052, 1054 are fixed to slides 1120, 1121, as by bolts, at 1051, 1053. Each slide 1120, 1121 is mounted on respective horizontal guide bars 230, 231 which are supported at their ends by the casing 1122 of gripper apparatus 10. Slide 1121 is connected by arm 1123 to a driving device 1124. Each of slides 1120, 1121 has a respective rack portion 1125, 1126 which engages a pinion 1127. Pinion 1127 is supported relative to casing 1122 by pin 232 which can rotate about axis 233. Driving device 1124 includes a shaft 1128 which is supported on bushings 1130 so that it can translate along axis 1129. Piston members 201, 202 are fixed to opposite ends of shaft 1128. These piston members slide in airtight chambers 203, 204, allowing translation of shaft 1128 back and forth along axis 1129. This translation can be caused by alternately pressurizing and depressurizing chambers 203, 204 behind pistons 201, 202 by means of appropriate conventional pneumatic equipment (not shown).

Slide 1121 is rigidly fixed to shaft 1128 by fixing arm 1123 against a shoulder 205 of shaft 1128 using a conventional elastic locking ring 206. When slide 1121 is caused to translate by movement of shaft 1128, pinion 1127 is also rotated by engagement with rack 1126, causing slide 1120 to translate by engagement with rack 1125. This allows gripping members 1052, 1054 to be moved toward and away from each other at the same rate in order to grip or release core 11 without shifting it along an axis transverse to axis 1018. Precompressed spring 207 is mounted between casing 1122 and arm 1123 and has a spring constant chosen to guarantee a gripping action on armature core 11 even if the air pressure in chamber 204 is lost. The air pressure supplied is then chosen so that the combined force of spring 207 and the air pressure causes gripping numbers 1052, 1054 to grip core 11 securely, but not so tightly that core 11 cannot be rotated within V-shaped gripping surface 1055-1058.

Gripping member 1052 has a plate 340 which is fixed to the main body of gripping member 1052 and connects gripping member 1052 to slide 1120 by means of bolts at 1051. The thickness and position of plate 340 allows gripping member 1052 to be centered along axis 1001 of gripper apparatus 1000. Gripping member 1052 has gripping surfaces 1055, 1057 as described above. The combined surface area of the V-shaped gripping surface is chosen so that correct contact pressure and stability can be maintained during gripping and transfer of the armature. Gripping member 1054, which will be described below, has opposing gripping surfaces 1056, 1058, also as described above, which have a combined surface area chosen to meet the same conditions.

Gripping member 1052 also includes an air cylinder arrangement 341 for actuating an indexing pawl 1060. Arrangement 341 includes a cylindrical sleeve 309 fixed to gripping member 1052 by means of bolts 342. Piston member 310 fixed to shaft 311 is caused to slide back and forth in sleeve 309 by passing pressurized air through appropriate feed bores (not shown). Shaft 311 is connected to pawl 1060 by means of fork member 343. Pawl 1060 can swivel on pin 344 of fork member 343. Pawl 1060 and fork member 343 sit in a slot 345 in gripping member 1052. As described below, slot 345 allows movement of pawl 1060 and other members during indexing operations.

Figure 10:
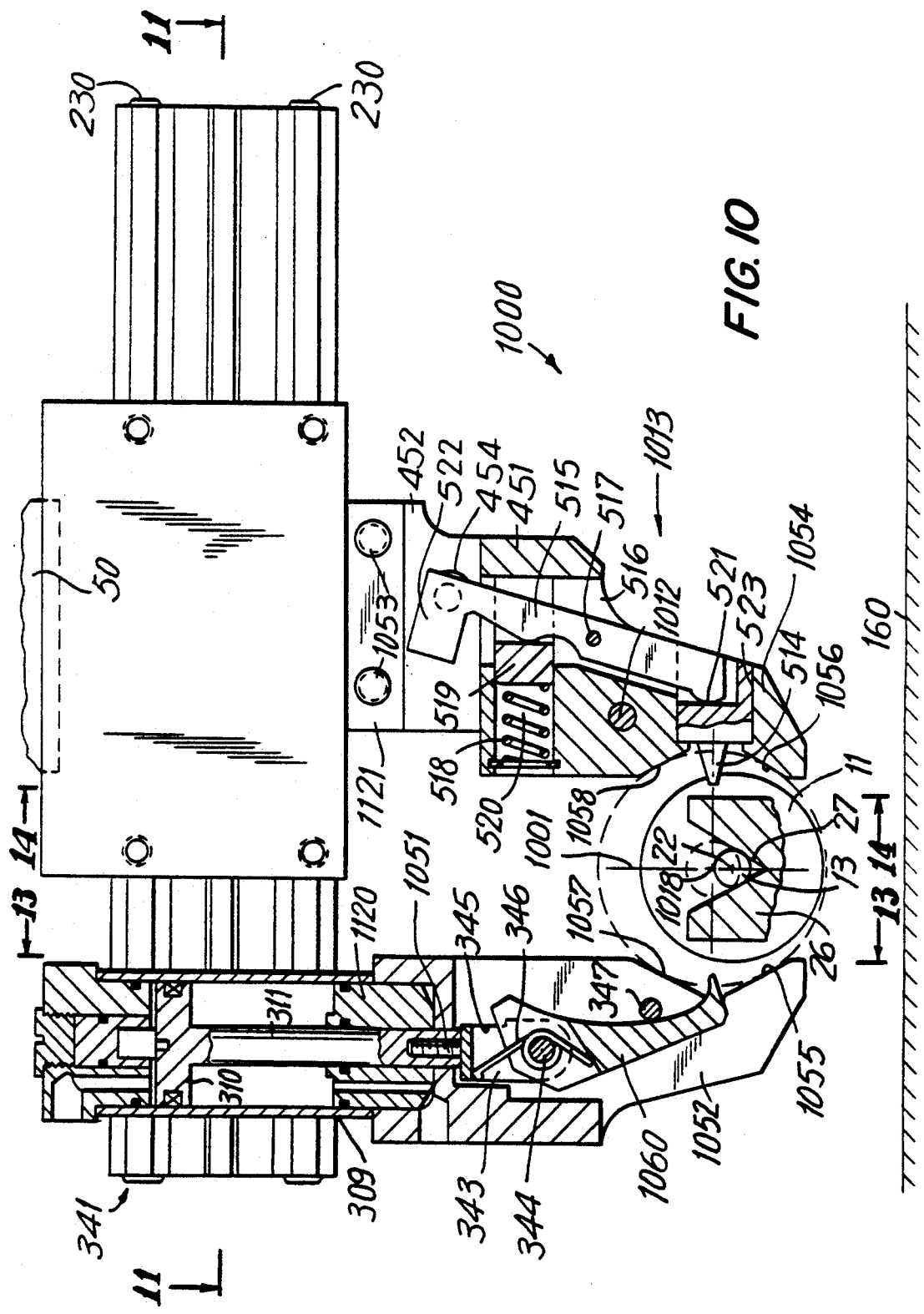
FIG. 10 is a side elevational view, partly in section, of a first preferred embodiment of gripper apparatus for use in the apparatus of the present invention, taken along the direction of the longitudinal axis of an armature to be gripped.
Figure 11:
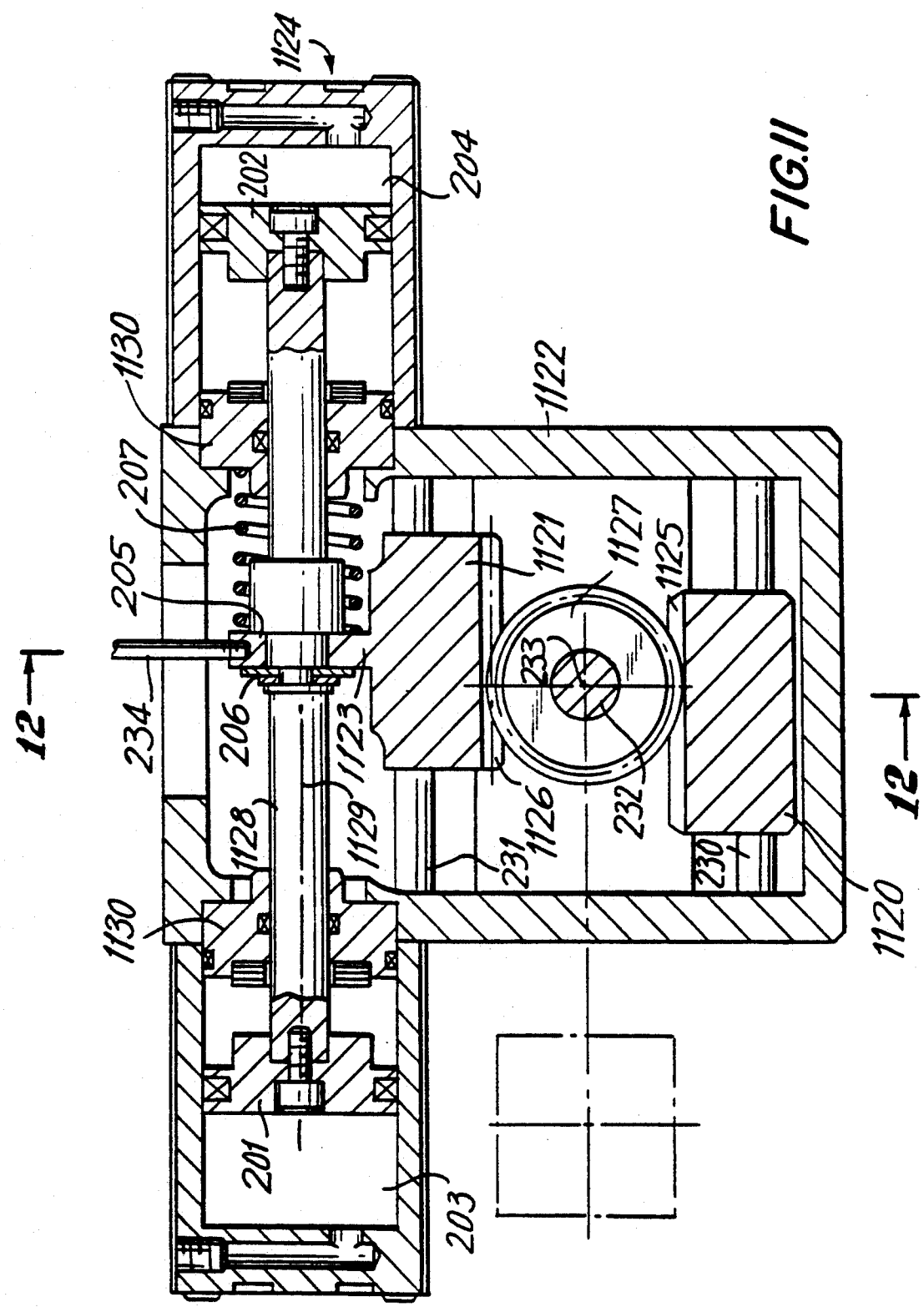
FIG. 11 is a horizontal cross-sectional view of the gripper apparatus of FIG. 10, taken from line 11—11 of FIG. 10.
Figure 12:
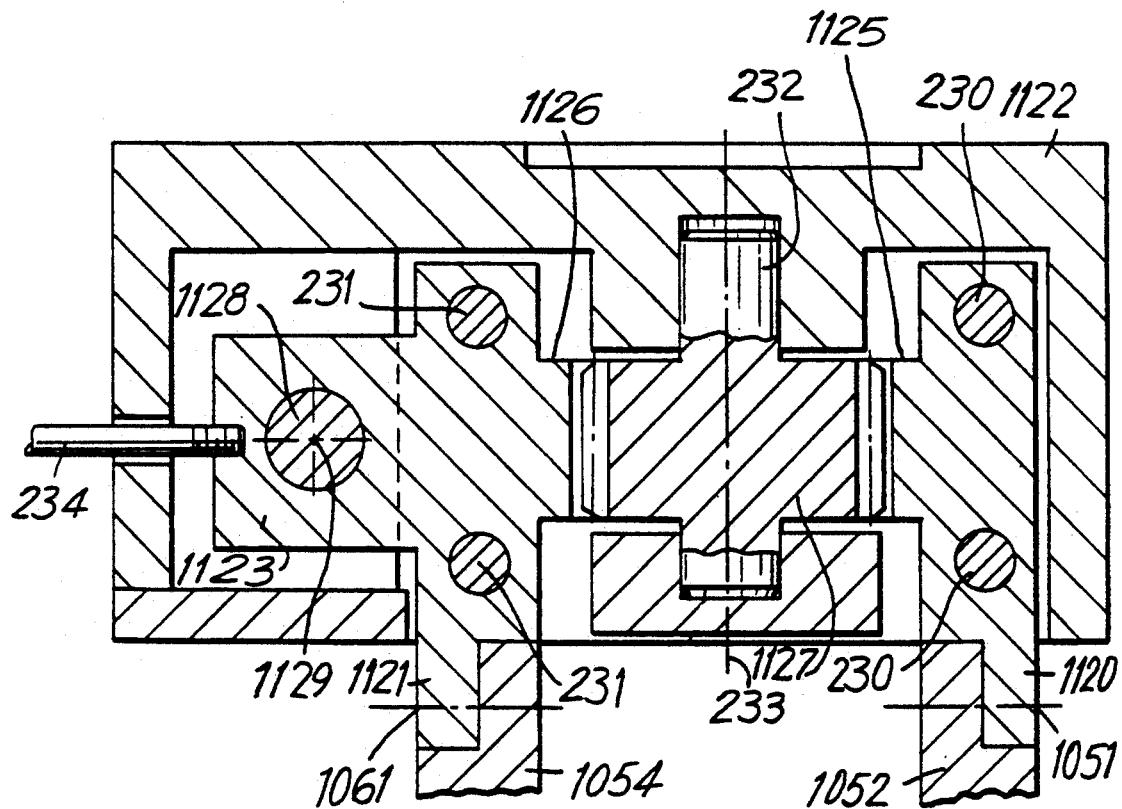
FIG. 12 is a fragmentary vertical cross-sectional view of the gripper apparatus of FIGS. 10 and 11, taken from line 12—12 of FIG. 11.
Figure 13:
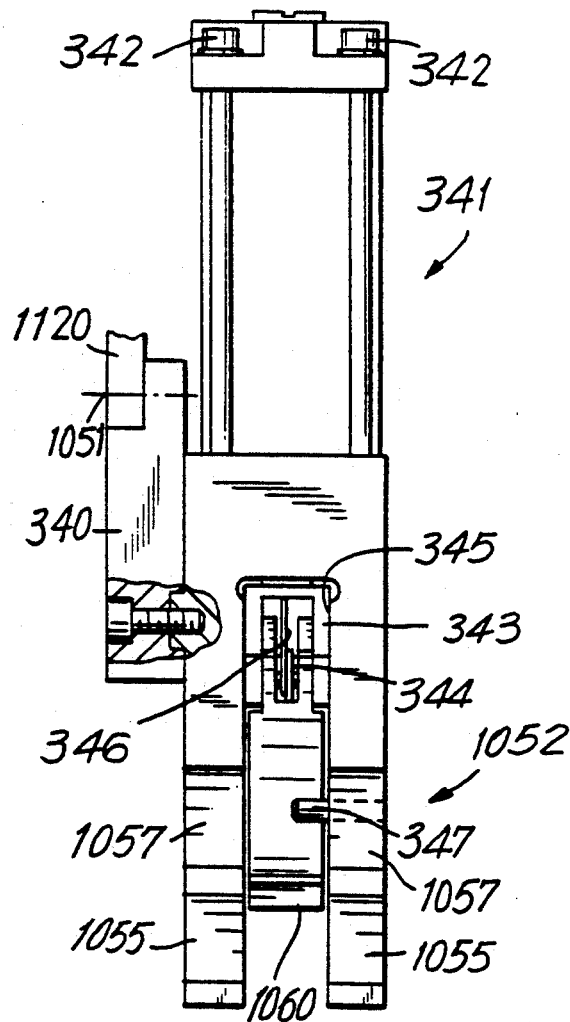
FIG. 13 is a vertical cross-sectional view of the gripper apparatus of FIGS. 10-12, taken from line 13—13 of FIG. 10.
Figure 14:
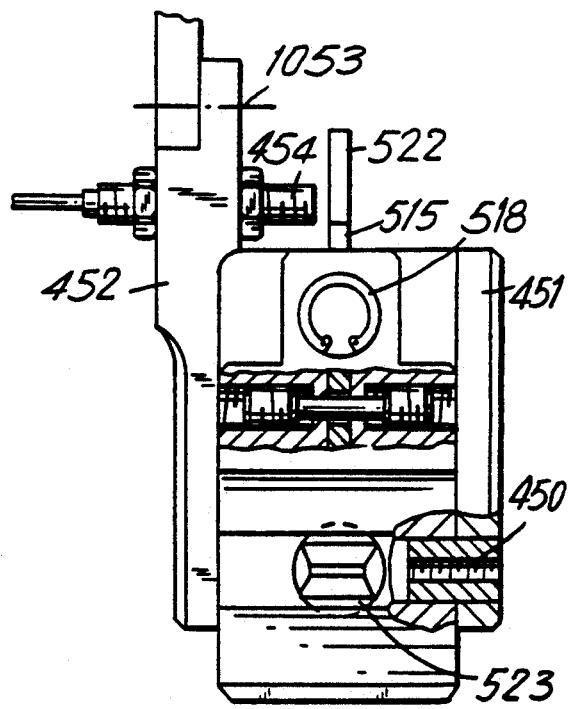
FIG. 14 is a fragmentary vertical cross-sectional view of the gripper apparatus of FIGS. 10-13, taken from line 14-14 of FIG. 10.

Pretensioned spring 346 mounted on pin 344 biases pawl 1060 towards the armature core. Pin 347 fixed to gripping member 1052 engages a camming surface of pawl 1060. As explained more fully below, this is required to control the motion of pawl 1060 about pin 344 under the biasing action of spring 346 when shaft 311 is retracted after an indexing operation. This guarantees that pawl 1060 returns to the desired rest position, as shown in FIG. 10, after an indexing operation.

Gripping member 1054 is mounted to swivel on pins 450 of bracket member 451. Bracket member 45 fixes gripping member 1054 to slide 1121 by means of extension 452 and bolts at 1053. The position and thickness of extension 452 guarantee that the axis of gripping member 1054 is centered on axis 1001 of gripper apparatus 1000.

After gripper apparatus 1000 has been assembled, a trial component of precisely known dimensions can be caused to be gripped by gripping members 1052, 1054. Once this has been accomplished, gripping member 1054 is permanently pinned (see pin 1012) to bracket member 451 so that during normal operation it is prevented from swivelling about pin 450. This compensates for machining errors and tolerance deviation which can occur during manufacturing of the various parts of gripper apparatus 1000.

Gripping member 1054 also includes an index sensing tooth mechanism 1013. Mechanism 1013 includes an index sensing tooth 514 which slides in a bore 523 of gripping member 1054. Lever 515 sits in a slot 516 of gripping member 1054. Lever 515 swivels about pin 517. A precompressed spring 518, which biases a cursor 519 for engaging and pushing lever 515 sits in a bore 520 of gripping member 1054. This causes end 521 of lever 515 to push index sensing tooth 514 towards the armature.

Enlarged end 522 of lever 515, remote from end 521, engages a proximity switch 454, thereby determining the position of tooth 514 during indexing operations.

Indexing operation of gripper apparatus 1000 will now be described.

When an armature is centered in gripper apparatus 1000 by supplying air to chamber 204, thereby moving gripping members 1052, 1054 towards each other, the core slots 560 can have any angular orientation in relation to axis 1001 of gripper apparatus 1000. The workstation to which apparatus 1000 is transferring the armature for processing may require that core slots 560 be positioned with a predetermined angular orientation, so that various operations such as winding, commutator placing and others can be correctly carried out.

In an assembly line producing different variations of armature, the number of core slots 560 can vary for each variation of armature to be processed. This means that the angular spacing between adjacent slots 560, which is usually the same for all the slots of a particular armature, can vary when changing the type of armature. Therefore, gripper apparatus 1000 according to the invention must be capable of orienting all possible slot combinations that can be foreseen.

Correct angular indexing requires that one of slots 560 of the armature 12 be positioned along a predetermined angular reference line in relation to the center of gripper apparatus 1000 or to an axis such as axis 1001.

Figure 15:
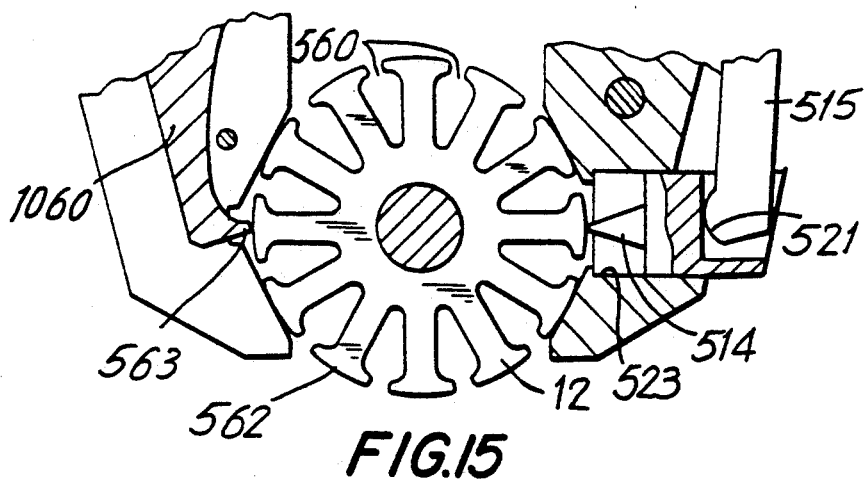
FIGS. 15-17 are fragmentary side elevational views of the gripper apparatus of FIGS. 10-14, taken from the same direction as FIG. 10 and showing different stages of indexing of an armature.
Figure 16:
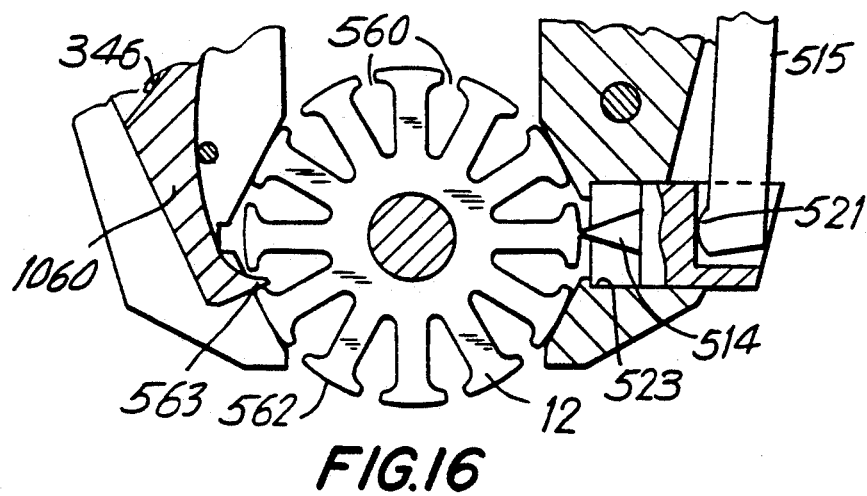
Figure 17:
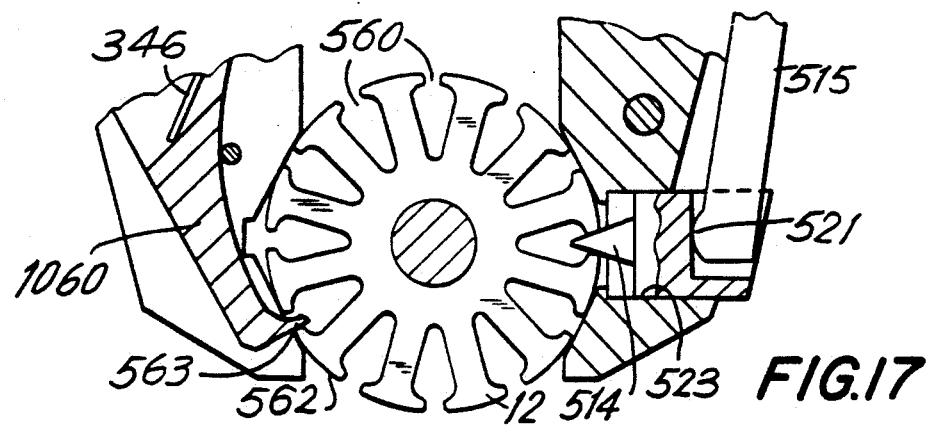

When an armature 12 is being gripped and centered by gripper apparatus 1000, the external surface 562 of armature 12 comes into contact with the protruding pawl 1060 and index sensing tooth 514. As seen in FIG. 15 as apparatus 1000 continues to close, both of these members retract away from armature 12 (pawl 1060 will swivel about pin 344 against the biasing action of spring 346, while index sensing tooth 514 will slide in bore 523, thereby rotating lever 515 which then clears proximity sensor 454). If index sensing tooth 514 falls into a slot 560 instead of contacting external surface 562 of armature 12 as previously described, then indexing will not have to be carried out, because, by chance, the armature will have been supplied with the slots in the required angular orientation dictated by index sensing tooth 514. A situation of this type is signalled by proximity sensor 454 because lever 515 does not rotate to clear it.

The extent of closure of the gripping member 1052, 1054, and thus the degree to which the armature has been gripped, can be measured by connecting a linear potentiometer (not shown) to pin 234. This potentiometer supplies an input to a programmable control (not shown) of gripper apparatus 1000, which controls the indexing operation. Alternatively, a pair of proximity sensors (not shown) could be provided, along with a cam or extension on pin 234. The length of the cam or extension would depend on the range of sizes of the core to be gripped. One proximity sensor would sense the cam or extension with gripping members 1052, 1054 in their maximum open position. The other proximity sensor would sense the cam or extension with gripping members 1052, 1054 firmly on the core. If the control receives signals from the first sensor, then from the second sensor, and then from neither sensor, that would indicate that gripping members 1052, 1054 had closed with no core present.

Once the armature has been centered and gripped, piston 310 can be actuated to extend shaft 3 and therefore move pawl 1060. During such movement, the pawl tip 563 runs on the core surface until it falls into a slot 560. Further extension of shaft 311 while pawl tip 563 is engaged in slot 560 causes armature 12 to rotate about axis 22.

At the same time that armature 12 is being rotated by means of pawl 1060, index sensing tooth 514 runs on external surface 562 of armature 12 until it falls into a slot 560. Once this occurs, the rotation of armature 12 under the driving action of the pawl 1060 is stopped by engagement of the index sensing tooth 514 with the dove tail sides of slot 560. This indicates that the required indexing has been accomplished, i.e., one of core slots 560 will have been positioned on the required angular reference line which is dictated by indexing tooth 514.

As soon as indexing tooth 514 has moved into slot 560, end 522 of lever 515 clears proximity switch 454, providing a signal for disengaging the mechanism actuating pawl 1060. Shaft 311 retracts, and pawl 1060 returns to its rest position under the action of spring 346. As discussed above, pin 347 bears on a surface of pawl 1060 to control the return of pawl 1060 to its rest position. In particular, pin 347 assures that pawl tip 563 moves away from the surface of armature 12 so as not to interfere with the discharge of armature 12 from apparatus 1000. The signal from switch 454 also initiates further operations as may be required after indexing, e.g., robot movement in order to align and deliver the armature 12 to the processing machine at the workstation.

It should be noted that tooth 514 will travel different distances into slots 560, depending on the width and length of tooth 514 and on the width and depth of slots 560. In some cases, depending on the dimensions, it may be necessary to provide a cam or extension (not shown) on end 522 to assure that proximity switch 454 can detect end 522 at the appropriate times. At the same time, care must be taken in selecting the cam size to assure that proximity switch 454 does not detect end 522 when it should not—e.g., when there is no core present or when tooth 514 is retracted.

Figure 18:
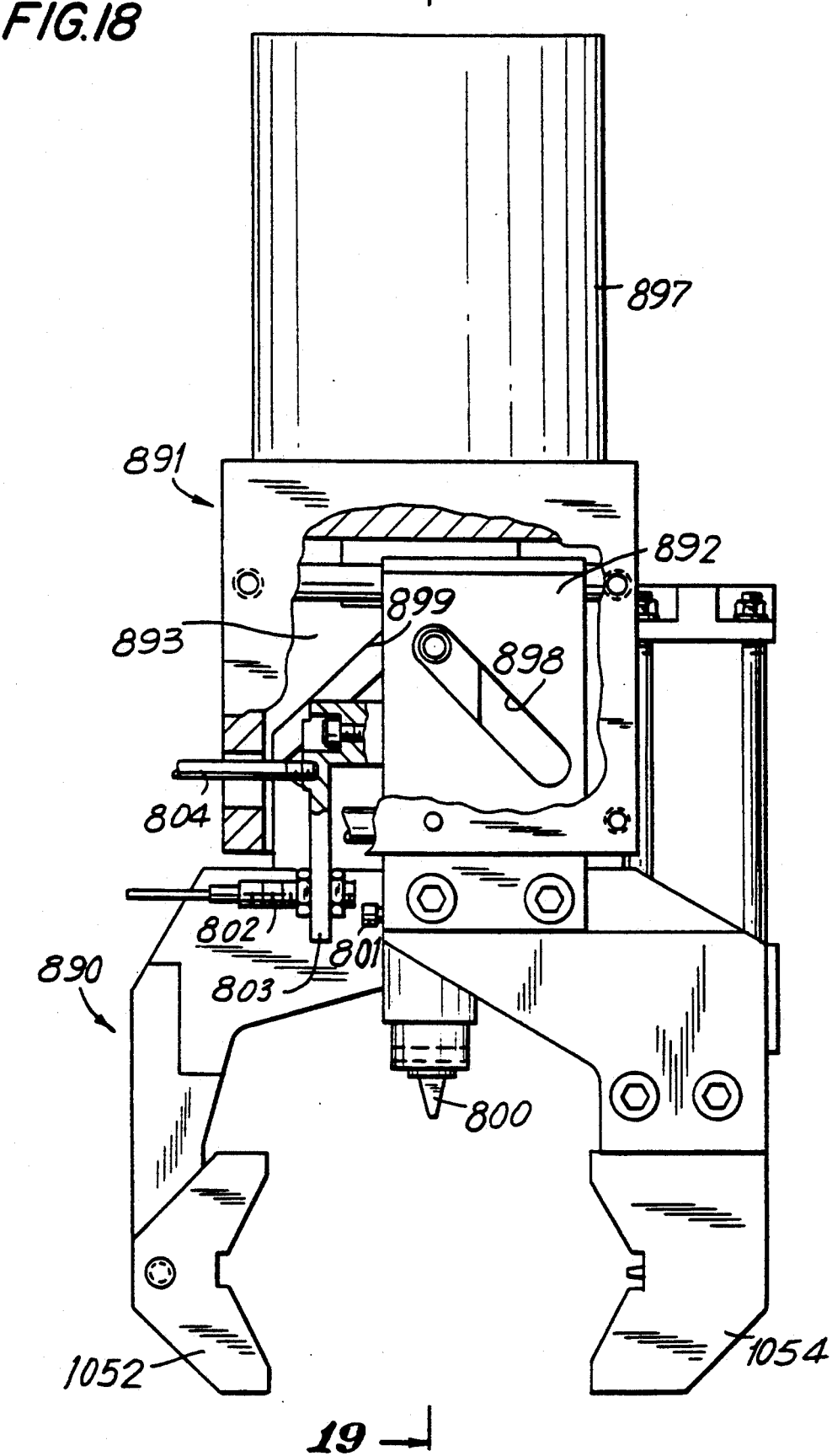
FIG. 18 is a side elevational view, partly in section, of a second preferred embodiment of a gripper apparatus for use in the apparatus of the present invention, taken along the direction of the longitudinal axis of an armature to be gripped.
Figure 19:
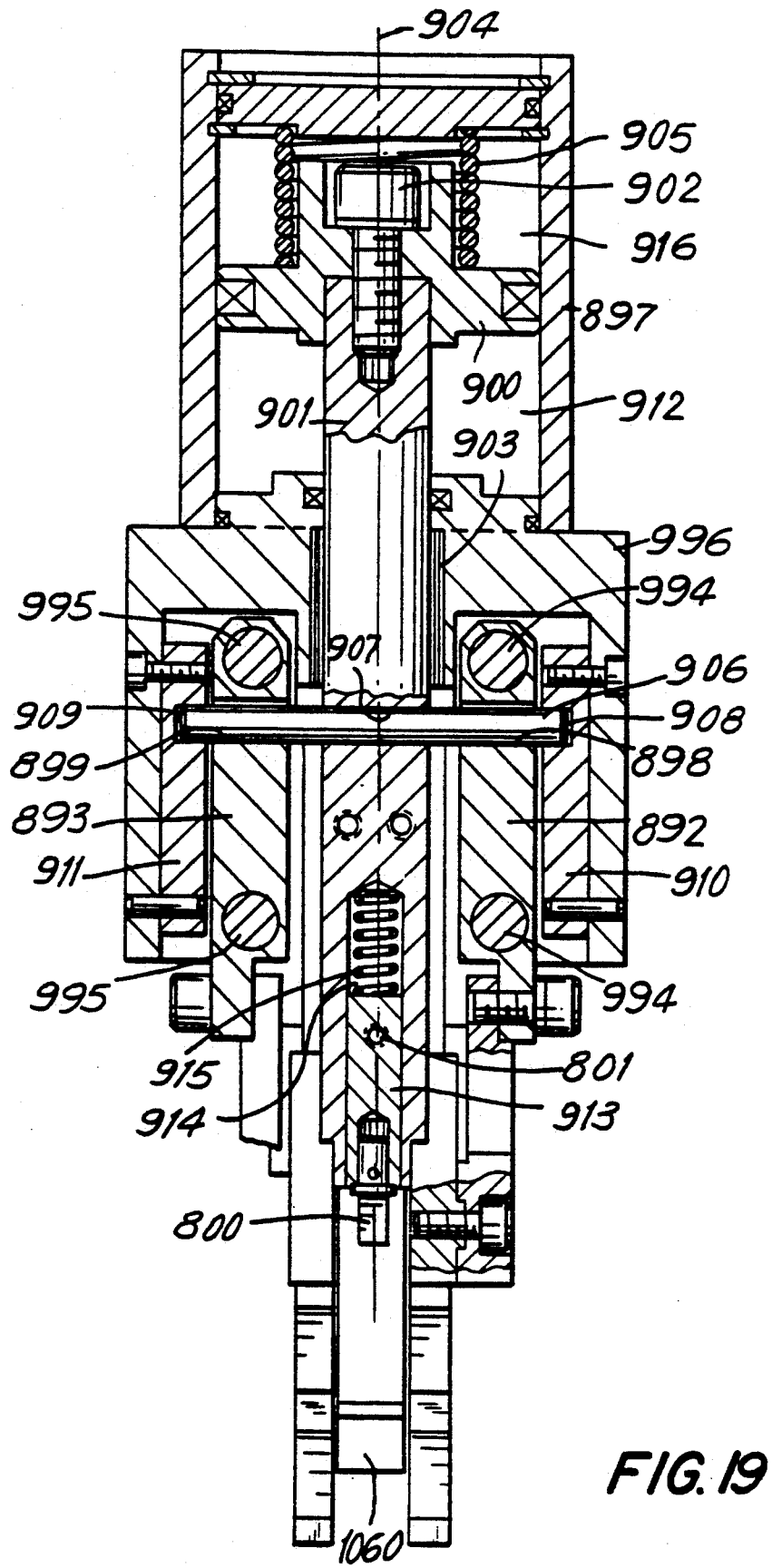
FIG. 19 is a vertical cross-sectional view of the gripper apparatus of FIG. 18, taken from line 19—19 of FIG. 18.

FIGS. 18 and 19 show a second embodiment of gripper apparatus 890 according to the invention, in which the indexing mechanism 891 is not carried by gripping member 1054, but by the means for moving gripping member 1054. This embodiment includes a slide 892 connected to gripping member 1052 and a further slide 893 connected to gripping member 1054. The slides are mounted on respective guide bars 994, 995 supported at their extremes by casing 996. Gripping member 1052 includes a pawl mechanism which is substantially identical to the one described in connection with the embodiment of FIGS. 10–17.

A cylinder 897 having piston 900 is mounted on casing 996. Shaft 901 is connected by means of bolt 902 to piston 900. Shaft 901 is supported in bushing 903 so that it can translate along axis 904 when precompressed spring 905 biases piston 900 downwards.

Pin 906 is mounted in a forced fit in transverse bore 907 of shaft 901. Pin 906 passes through inclined slots 898, 899 of slides 892, 893. The tips of pin 906 are engaged and guided by inclined slots 908, 909 of guide members 910, 911, which are fixed relative to casing 996 (e.g., by means of bolts and pins).

When chamber 916 is pressurized and chamber 912 is depressurized, the combined action of the air pressure and spring 905 extends shaft 901 along axis 904. This extension of shaft 901 causes pin 906 to slide in inclined slots 898, 899 of slides 892, 893. As it slides, pin 906 pushes slides 892, 893 towards each other (slots 898, 899 are oppositely inclined relative to each other in order to achieve this result). This causes gripping members 1052, 1054 to center and grip armature 12. As described above in connection with the embodiments of FIGS. 10–17, the spring constant of spring 905 is chosen so that armature 12 remains gripped even if air pressure is lost, and the amount of air pressure supplied is then chosen so that the combined force causes gripping members 1052, 1054 to grip armature 12 securely, but not so tightly that armature 12 cannot be rotated.

Index sensing tooth 800 is carried by a cursor 913 which is slidably seated in a bore 914 of shaft 901. In addition to causing gripping members 1052, 1054 to move toward each other, extension of shaft 901 also pushes index sensing tooth 800 into contact with surface 562 of armature 12 and causes tooth 800 to partially retract within bore 914 of shaft 901.

The angles of slots 898, 899 must be chosen with consideration given to the sizes of armatures to be worked on. The angle must not be so steep that in order to grip armature surface 562, shaft 901 must touch armature surface 562. This would interfere with rotation of the armature as well as with operation of tooth 800. It may also damage shaft 901. The angle also must not be so shallow that gripping members 1052, 1054 cannot be brought close enough together. Ideally, the end of shaft 901, and of bore 914 and cursor 913, should always be the same distance from core surface 562.

Precompressed spring 915 biases cursor 913 and therefore tooth 800 towards armature 12 in order to maintain tooth 800 in contact with core surface 562 and to push it into a slot 560 when the final index position is reached under the driving action of pawl 1060.

Pin 801 fixed to cursor 913 engages a proximity switch 802 carried by bracket 803 which is fixed to shaft 901 whenever index sensing tooth 800 is sufficiently extended, such as when it enters a core slot. In this condition, pin 801 engages proximity switch 802 to provide a signal. This signal is used after gripping has occurred, and the tooth enters core slot 560, to disengage the mechanism activating pawl 1060 and to allow any operations that follow indexing to be carried out. When index sensing tooth 800 is completely extended (i.e., falls into a slot 560 at least as wide as the maximum width of tooth 800, or is not in contact with core surface 562), pin 801 abuts against a stop and limits the excursion of cursor 913 under the biasing action of spring 915. As stated above in connection with the first embodiment, a cam or extension on pin 801 may be necessary to assure that switch 802 detects pin 801 when it should, while not causing pin 801 to be detected when it should not be.

Pin 804 fixed to bracket 803 can be connected to a linear potentiometer, as described in connection with the embodiment of FIGS. 10–17, which signals the system controls when the required gripping position has been reached for a predetermined core size. Alternatively, as discussed in connection with the embodiment of FIGS. 10–17, two proximity sensors cooperating with an approximate cam or extension mounted on pin 804 could perform this function.

Figure 20:
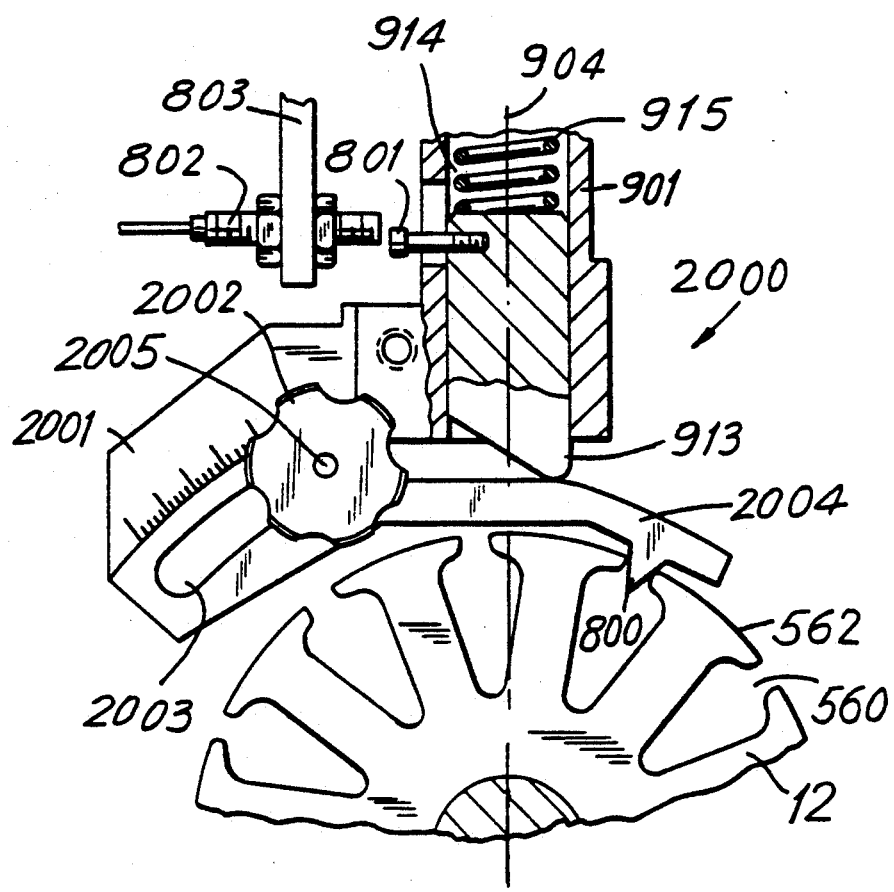
FIG. 20 is a fragmentary elevational view of a gripper apparatus for use with the apparatus of the present invention showing optional angular adjustment means.
Figure 21:
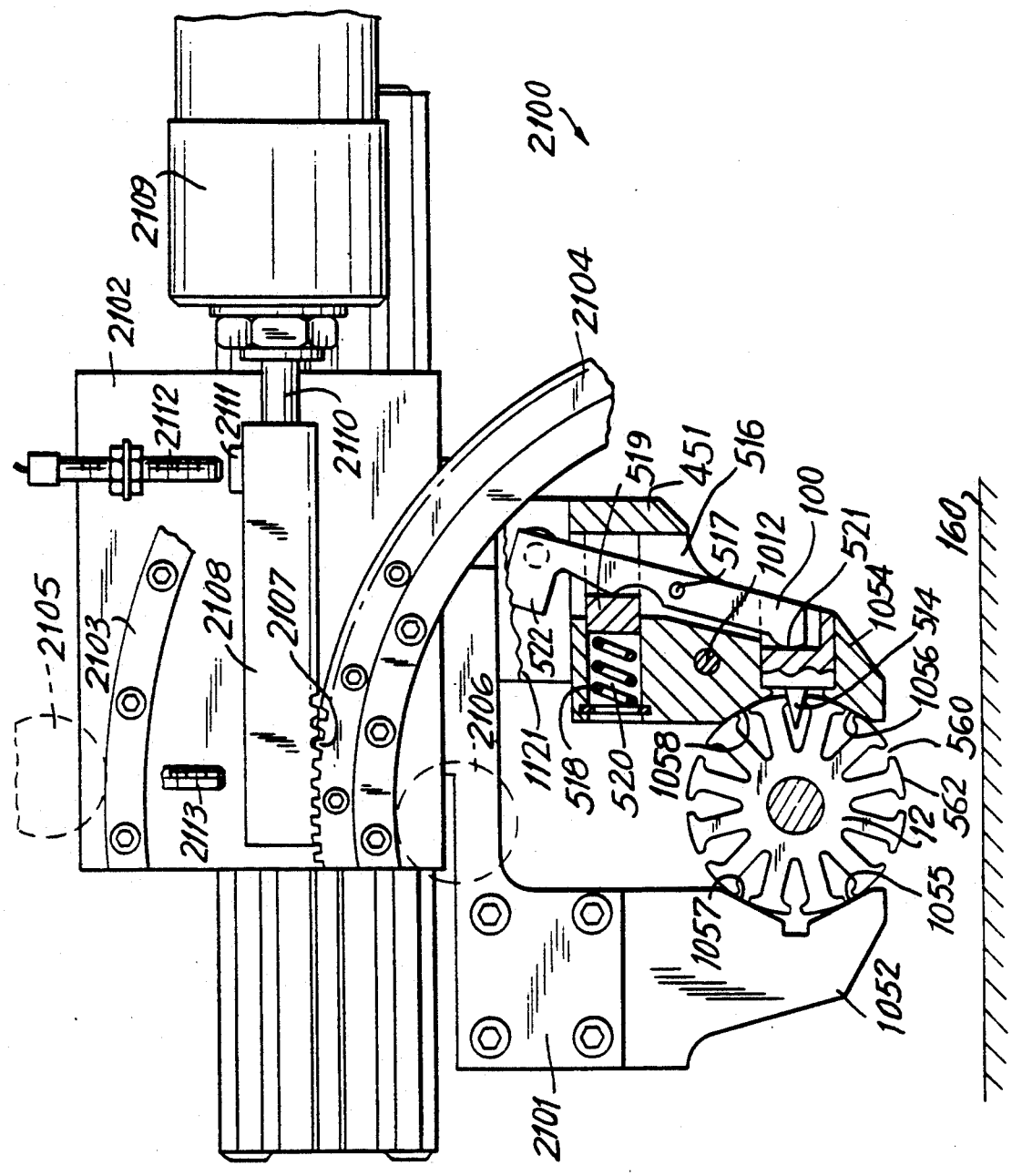
FIG. 21 is a side elevational view, partly in section, of a third preferred embodiment of a gripper apparatus for use with the apparatus of the present invention, taken along the direction of the longitudinal axis of an armature to be gripped.

FIG. 20 shows a modification which can be used with the embodiment of FIGS. 18 and 19. This modification is a mechanism 2000 for changing the angular position of index sensing tooth 800 in order to obtain orientations of core slots 560 with an angular shift relative to an axis such as axis 904. This modification may be required in a commutator placing operation where the relative angle between the commutator and armature 12 can vary from armature to armature, even with armatures of the same size. The modification allows such variations to be dealt with without complex orientation mechanisms in the commutator placing equipment.

Mechanism 2000 can be applied to the apparatus of FIGS. 18 and 19 without modifications to the underlying apparatus. According to the modification, shaft 901 continues to have bore 914 for seating spring 915, which biases a moveable cursor 913. Shaft 901 carries a support bracket 2001 in which a shaft 2005 of knob 2002 is journalled. The shaft of knob 2002 can be moved in a precisely machined arcuate slot 2003 of bracket 2001 in order to change its angular position relative to axis 904. An arm 2004 carrying index sensing tooth 800 is hinged to shaft 2005 of knob 2002 so that tooth 800 can move toward and away from armature 12. Cursor 913 engages arm 2004 in order to maintain index sensing tooth 800 in contact with armature 12 or for pushing it into an aligned slot 560 of armature 12. By moving shaft 2005 of knob 2002 along slot 2003, tooth 800 can be precisely positioned relative to axis 904 in order to shift the angular position of index sensing tooth 800 and thereby to obtain a desired predetermined angular shift.

Thus it is seen that apparatus according to the present invention, having the indexing mechanism as part of the gripper, avoids the need for costly indexing equipment which would have to be provided as part of the processing machine, and which thus would require a custom design to adapt it to the specific machine.

Apparatus according to the invention is also seen to allow indexing while the armature is being transferred, rather than waiting until transfer is complete before beginning angular orientation.

A further advantage of the indexing mechanism according to the invention is that tooth 514 or 800 engages the inside of armature slot 560, providing a positive safety stop. The mechanism also provides a sensor which signals when the stop is engaged, thereby doubling as a safety mechanism.

It should be noted that while in both apparatus 1000 and apparatus 890, pawl 1060 is used to rotate armature 12 relative to the apparatus, it is also possible to provide a mechanism for rotating at least a portion of apparatus 1000 or 890 with tooth 514 or 800 relative to armature 12. In such an embodiment, illustrated in FIG. 21, the apparatus would rotate in one direction until the tooth enters a slot 560. The apparatus would then stop, lock onto armature 12, and rotate in the other direction about the axis of armature 12 back to its initial position.

As seen in FIG. 21, apparatus 2100 again includes gripping members 1052, 1054 similar to those in the embodiment of FIGS. 10-17, except that here gripping member 1052 lacks pawl 1060 and arrangement 341 for actuating pawl 1060. Gripping member 1052 is attached to slide 2101 which is similar to slide 1120 and is connected to actuation means, located inside casing 2102, similar to that shown in connection with the embodiment of FIGS. 10-17. It should be noted that slide 1120 is similarly connected (see FIG. 12), but that connection is cut away in FIG. 10 to show the detail of arrangement 341.

Arcuate rails 2103, 2104 are affixed to the exterior of casing 2102 and ride along wheels 2105, 2106 (and other wheels not shown arranged along an arcuate path) affixed to an external frame (not shown). Gear teeth 2107 on rail 2104 mesh with complementary teeth on gear rack 2108, which can move back and forth horizontally under the action of actuator 2109.

Gripping members 1052, 1054 are closed on armature 12 as described in connection with the embodiment of FIGS. 10-17. As there, here gripping members 1052, 1054 close on armature 12 securely, but not so tightly that armature 12 cannot be rotated within V-shaped surface 1055-1058. In addition, because here the mechanism will be rotated instead of the core, a means (not shown) is provided to lock armature shaft 13 to prevent accidental rotation of armature 12 along with the mechanism. Such locking means might be part of seats 27.

If when gripping members 1052, 1054 close index sensing tooth 514 by chance immediately enters a slot 560, then no rotation is required. That condition is signalled by proximity switch 454, and the next step in processing armature 12 is initiated. In most cases, however, index sensing tooth 514 will initially contact surface 562, which again will be signalled by proximity switch 454. As a result, shaft 2110 would be extended by actuator 2109, causing rack 2108 to engage teeth 2107 to rotate apparatus 2100 counterclockwise. Rotation continues until tooth 514 enters a slot 560.

When tooth 514 enters a slot 560, that condition is signalled by switch 454, which stops actuator 2109. Armature shaft 13 is then unlocked, and gripping members 1052, 1054 grip armature 12 more tightly. Actuator 2109 then retracts shaft 2110 and rack 2108, returning apparatus 2100 to its original orientation, as signalled by the interaction of pad 2111 and proximity switch 2112. A further proximity switch 2113 serves as a failsafe device, stopping actuator 2109 in the extraordinary case where no armature is present between gripping members 1052, 1054, but actuator 2109 is nevertheless engaged.

The length of the stroke of shaft 2110 and of rack 2108 are functions of the maximum rotation angle, which depends on the maximum expected angle between slots 560 and on the maximum expected diameter of armature 12.

Thus it is seen that gripper apparatus for electric motor components that can be used to grip components of different sizes, and that can rotationally index electric motor components of different sizes, is provided.

It will be understood that the foregoing is merely illustrative of the principles of this invention, and that various modifications can be made by those skilled in the art without departing from the scope and spirit of the invention. For example, although the two armatures to be processed simultaneously by the depicted winding station are conveyed to and from the winding station on separate pallets, both armatures could be conveyed side by side on a single pallet if desired.

We claim:

1. Apparatus for substantially simultaneously processing a plurality of electric motor parts, each of said motor parts having a predetermined longitudinal axis, each of said motor parts being delivered to said apparatus by delivery means with any of several angular orientations about its longitudinal axis, and each of said motor parts having to be at least temporarily in a predetermined angular orientation about its longitudinal axis during processing by said apparatus, said apparatus comprising:

first means for removing a first motor part from said delivery means and for rotating said first motor part about its longitudinal axis until said first motor part has the predetermined angular portion about its longitudinal axis;

second means for removing a second motor part from said delivery means and for rotating said second motor part about its longitudinal axis until said second motor part has the predetermined angular position about its longitudinal axis; and third means for engaging said first and second motor parts after rotation by said first and second means and for substantially simultaneously further processing said first and second motor parts.

2. The apparatus defined in claim 1 wherein said third means removes said first and second motor parts from said first and second means prior to further processing said first and second motor parts.

3. The apparatus defined in claim 1 wherein each of said motor parts includes means for indicating the angular orientation of said motor part about its longitudinal axis, and wherein each of said first and second means includes means for sensing said means for indicating in order to determine when said motor part has the predetermined angular position about its longitudinal axis.

4. The apparatus defined in claim 3 wherein each of said motor parts is an armature having a substantially cylindrical surface which includes a plurality of slots extending parallel to the longitudinal axis of said armature and spaced from one another about the circumference of said cylindrical surface, said slots being said means for indicating the angular orientation of said motor parts about its longitudinal axis.

5. The apparatus defined in claim 4 wherein said means for sensing in each of said first and second means comprises a member resiliently biased into contact with said cylindrical surface so that said member can move into a slot when said motor part is rotated so that said slot is opposite said member.

6. The apparatus defined in claim 4 wherein each of said first and second means includes a pawl member insertable in one of said slots for rotating the motor part about its longitudinal axis.

7. The apparatus defined in claim 1 wherein each of said first and second means includes means for preventing rotation of an associated motor part after said electric motor part has been rotated said predetermined angular position about its longitudinal axis.

8. The apparatus defined in claim 7 wherein said third means engages said first and second motor parts while said means for preventing rotation of said first and second means are preventing rotation of said first and second motor parts, and wherein said third means removes said first and second motor parts from said first and second means without rotating said first and second motor parts during removal from said first and second means.

9. The apparatus defined in claim 8 wherein said third means comprises:
means for rotating each of said first and second motor parts about its longitudinal axis by predetermined increments starting from the predetermined angular position of said motor part.

10. The apparatus defined in claim 9 wherein said third means further comprises:
means for winding at least one coil of wire on each of said first and second motor parts after at least some of said increments of rotation of said first and second motor parts.

11. Apparatus for substantially simultaneously processing a plurality of electric motor parts, each of said motor parts having a predetermined longitudinal axis, each of said motor parts being delivered to said apparatus by delivery means with any of several angular orientations about its longitudinal axis, and each of said motor parts having to be at least temporarily in a predetermined angular orientation about its longitudinal axis during processing by said apparatus, said apparatus comprising:
first means for removing a first motor part from said delivery means and for rotating said first motor part about its longitudinal axis until said first motor part has the predetermined angular position about its longitudinal axis;
second means coupled to said first means and for removing a second motor part from said delivery means and for rotating said second motor part about its longitudinal axis until said second motor part has the predetermined angular position about its longitudinal axis;
third means for substantially simultaneously removing said first and second motor parts from said first and second means with the angular orientation of each of said first and second motor parts about its respective longitudinal axis substantially unaltered from the respective predetermined angular position; and
fourth means for substantially simultaneously further processing said first and second motor parts, said fourth means including means for rotating each of said first and second motor parts about its respective longitudinal axis by a respective predetermined amount starting from the respective predetermined angular position in which said third means receives said first and second motor parts from said first and second means.

12. The apparatus defined in claim 11 wherein said fourth means includes means for winding at least one coil of wire on each of said first and second motor parts.

13. The apparatus defined in claim 12 wherein said fourth means includes means for successively winding a plurality of coils of wire on each of said first nd second motor parts, said coils on each of said motor parts being displaced from one another angularly about the longitudinal axis of the motor part, and said fourth means rotating each of said first and second motor parts about its longitudinal axis between winding successive coils.

14. The apparatus defined in claim 13 wherein said first and second motor parts are armatures, each of said armatures having a substantially cylindrical surface substantially concentric with its longitudinal axis, said cylindrical surface having a plurality of radially inwardly extending slots spaced circumferentially from one another about the longitudinal axis, and wherein each coil is wound so that it passes through two circumferentially spaced slots on the associated armature.

15. The apparatus defined in claim 11 wherein said first and second motor parts are disposed in said third and fourth means so that one of said motor parts is vertically above the other.

16. The apparatus defined in claim 11 wherein each of said motor parts includes means for indicating the angular orientation of said motor part about its longitudinal axis, and wherein each of said first and second means includes means for sensing said means for indicating in order to determine when said motor part has the predetermined angular position about its longitudinal axis.

17. The apparatus defined in claim 16 wherein each of said motor parts is an armature having a substantially cylindrical surface substantially concentric with its longitudinal axis, said cylindrical surface being interrupted by a plurality of radially inwardly extending slots spaced circumferentially from one another about the longitudinal axis, said slots being said means for indicating the angular orientation of said armature about its longitudinal axis.

18. The apparatus defined in claim 17 wherein said means for sensing in each of said first and second means comprises a member resiliently biased into contact with said cylindrical surface so that said member can move into a slot when said armature is rotated so that said slot is opposite said member.

19. The apparatus defined in claim 17 wherein each of said first and second means includes a pawl member insertable in one of said slots for rotating the motor part about its longitudinal axis.

* * * * *

UNITED STATES PATENT AND TRADEMARK OFFICE
CERTIFICATE OF CORRECTION

PATENT NO. : 5,257,689
DATED : November 2, 1993
INVENTOR(S) : Lombardi et al.

It is certified that error appears in the above-indentified patent and that said Letters Patent is hereby corrected as shown below:

Column 4, line 21, "pelletized" should be --palletized--.

Column 6, line 37, "Viewed" should be --viewed--.

Column 10, line 9, "Which" should be --which--.

Column 11, line 11, "45" should be --451--.

Column 12, line 35, "3" should be --311--.

Column 16, Claim 1, line 37, "portion" should be --position--.

Column 16, Claim 4, line 66, "parts" should be --part--.

Column 17, claim 7, line 12, --to-- should be inserted after "rotated".

Column 18, claim 13, line 17, "nd" should be --and--.

Signed and Sealed this

Twenty-first Day of June, 1994

Attest:

BRUCE LEHMAN

*Attesting Officer*    *Commissioner of Patents and Trademarks*